United States Patent
Lin et al.

(10) Patent No.: US 12,500,757 B2
(45) Date of Patent: Dec. 16, 2025

(54) TRUSTED COMPUTING-BASED LOCAL KEY ESCROW METHOD, APPARATUS, DEVICE AND MEDIUM

(71) Applicant: Tencent Cloud Computing (Beijing) Co., Ltd., Beijing (CN)

(72) Inventors: Weikun Lin, Beijing (CN); Shengli Ji, Beijing (CN); Zhiqiang Dong, Beijing (CN); Bin Li, Beijing (CN)

(73) Assignee: Tencent Cloud Computing (Beijing) Co., Ltd. (CN)

( * ) Notice: Subject to any disclaimer, the term of this patent is extended or adjusted under 35 U.S.C. 154(b) by 283 days.

(21) Appl. No.: 18/320,614

(22) Filed: May 19, 2023

(65) Prior Publication Data
US 2023/0291558 A1    Sep. 14, 2023

Related U.S. Application Data

(63) Continuation of application No. PCT/CN2021/108934, filed on Jul. 28, 2021.

(30) Foreign Application Priority Data

Mar. 18, 2021   (CN) .......................... 202110290118.2

(51) Int. Cl.
*H04L 29/06* (2006.01)
*H04L 9/08* (2006.01)

(52) U.S. Cl.
CPC ................................ *H04L 9/0897* (2013.01)

(58) Field of Classification Search
None
See application file for complete search history.

(56) References Cited

U.S. PATENT DOCUMENTS

| 6,836,548 B1 * | 12/2004 | Anderson | G06F 21/73 |
| | | | 713/168 |
| 9,389,933 B2 * | 7/2016 | Baumann | G06F 21/602 |
| | (Continued) | | |

FOREIGN PATENT DOCUMENTS

| CN | 107111715 A | 8/2017 |
| CN | 109150517 A | 1/2019 |
| | (Continued) | |

OTHER PUBLICATIONS

Extended European Search Report issued in European Patent Application No. 21931105.7 dated Aug. 5, 2024, 9 pages.
(Continued)

*Primary Examiner* — Maung T Lwin
(74) *Attorney, Agent, or Firm* — Crowell & Moring LLP

(57) ABSTRACT

This application provides a trusted computing-based local key escrow method, apparatus, device and medium. The method includes: determining an executable file associated with an untrusted environment and a dynamic link file associated with a trusted environment in response to acquiring an enclave interface definition file from a local internal memory; determining an environment access interface based on a container identifier indicated by the trusted environment in response to loading the dynamic link file based on the executable file; reading sealed data file obtained by encrypting serialized data based on a local key in the untrusted environment in response to accessing an enclave container in the trusted environment through the environment access interface; and decrypting the sealed data file using the local key and deserializing the decrypted sealed data file in the enclave container to obtain service data for loading into a trusted internal memory indicated by the enclave container.

20 Claims, 13 Drawing Sheets

(56) References Cited

U.S. PATENT DOCUMENTS

| | | | | |
|---|---|---|---|---|
| 9,667,416 | B1* | 5/2017 | Machani | H04L 9/3215 |
| 10,762,197 | B1* | 9/2020 | Yu | H04L 9/50 |
| 11,646,890 | B2* | 5/2023 | Pålsson | H04L 9/3234 |
| | | | | 713/168 |
| 2002/0114453 | A1* | 8/2002 | Bartholet | H04L 9/0662 |
| | | | | 713/153 |
| 2015/0121536 | A1 | 4/2015 | Xing et al. | |
| 2019/0065406 | A1 | 2/2019 | Steiner et al. | |
| 2020/0220898 | A1 | 7/2020 | Kumar et al. | |

FOREIGN PATENT DOCUMENTS

| | | |
|---|---|---|
| CN | 110889696 A | 3/2020 |
| CN | 110998581 A | 4/2020 |
| CN | 111262889 A | 6/2020 |
| CN | 112148296 A | 12/2020 |

OTHER PUBLICATIONS

Communication pursuant to Rules 70(2) and 70a(2) EPC issued in European Patent Application No. 21931105.7 dated Aug. 23, 2024, 1 page.
Park et al. "An SGX-Based Key Management Framework for Data Centric Networking", IEEE Access, Mar. 3, 2020, 13 pages.
Office Action issued in Chinese Patent Application No. 202110290118.2 dated Apr. 21, 2024, w/English translation, 18 pages.
International Search Report with English translation, dated Dec. 8, 2021, pp. 1-5, issued in International Patent Application No. PCT/CN2021/108934, China National Intellectual Property Administration, Beijing, China.

\* cited by examiner

TRUSTED COMPUTING-BASED LOCAL KEY ESCROW METHOD, APPARATUS, DEVICE AND MEDIUM

RELATED APPLICATION

This application is a continuation of PCT application number PCT/CN2021/108934 filed on Jul. 28, 2021, which claims priority to Chinese Patent Application No. 2021102901182, entitled "TRUSTED COMPUTING-BASED LOCAL KEY ESCROW METHOD, APPARATUS, DEVICE and MEDIUM" filed on Mar. 18, 2021. Both of these applications are incorporated by reference in their entirety.

FIELD OF THE TECHNOLOGY

This application relates to the field of data security technologies, and in particular, to a trusted computing-based local key escrow method, apparatus, device and medium

BACKGROUND OF THE DISCLOSURE

In today's network environment, data encryption is usually used to ensure the security of user data, that is, encryption keys are used to encrypt user data. At present, data encryption mainly depends on a key storage scheme of computer hardware. The key storage scheme refers to that an extra encryptor is used to store the encryption key, so as to encrypt and decrypt the user data by using the encryption key stored in the encryptor. This means that the encryptor needs to expose different ports (such as a service port, a management port, a monitoring port, etc.) to the outside when running normally.

SUMMARY

Embodiments of this application provide to a trusted computing-based local key escrow method, apparatus, device and medium, to improve the security of storing service data locally by decrypting the service data using a local key in an enclave container.

According to one aspect, a trusted computing-based local key escrow method is provided, including: acquiring an executable file and a dynamic link file based on an enclave interface definition file in a local internal memory, the enclave interface definition file being used for environment compilation, the executable file being associated with untrusted environment, and the dynamic link file being associated with a trusted environment; loading the dynamic link file based on the executable file, and determining an environment access interface associated with the trusted environment; reading a sealed data file from the untrusted environment through an enclave container in the trusted environment during accessing the trusted environment through the environment access interface, the sealed data file being obtained by encrypting serialized data based on a local key in the enclave container, and the serialized data being obtained by serializing service data requested by an application client in the enclave container; and decrypting the sealed data file to obtain the serialized data based on the local key in the enclave container, and deserializing the serialized data to obtain the service data, the service data being used for being loaded into a trusted internal memory indicated by the enclave container.

According to one aspect, a trusted computing-based local key escrow apparatus is provided, including:

a file compiling module, configured to acquire an executable file and a dynamic link file based on an enclave interface definition file in a local internal memory, the enclave interface definition file being used for environment compilation, the executable file being associated with untrusted environment, and the dynamic link file being associated with a trusted environment;

an interface access module, configured to load the dynamic link file based on the executable file, and determine an environment access interface associated with the trusted environment;

a container access module, configured to read a sealed data file from the untrusted environment through an enclave container in the trusted environment during accessing the trusted environment through the environment access interface, the sealed data file being obtained by encrypting serialized data based on a local key in the enclave container, and the serialized data being obtained by serializing service data requested by an application client in the enclave container; and a data determining module, configured to decrypt the sealed data file to obtain the serialized data based on the local key in the enclave container, and deserialize the serialized data to obtain the service data, the service data being used for being loaded into a trusted internal memory indicated by the enclave container.

According to one aspect, a computer device is provided, including: a processor and a memory, the processor being connected to the memory, and the memory being configured to store a computer program, the computer program, when executed by the processor, causes the computer device to perform the method in the embodiments of this application.

According to one aspect, a computer-readable storage medium is provided, storing a computer program, the computer program being configured to be loaded and executed by a processor, to cause a computer device including the processor to perform the method in the embodiments of this application.

According to an aspect, a computer program product or a computer program is provided, including computer instructions, the computer instructions being stored in a computer-readable storage medium. A processor of a computer device reads the computer instructions from the computer-readable storage medium, and executes the computer instructions, so that the computer device executes the method in the embodiments of this application.

In the embodiments of this application, a computer device may provide an efficient local service building framework based on an application scenario of trusted computing, and further provide an efficient local service, for example, a local key escrow service, for an application client through the built local service framework. By utilizing the enclave container created in the trusted environment, the security of the local key can be effectively ensured, so that the security of the service data stored in the trusted internal memory can be ensured when the service data is encrypted and decrypted by the local key derived from the secure and trusted enclave container.

BRIEF DESCRIPTION OF THE DRAWINGS

To describe the technical solutions of the embodiments of this application or the related art more clearly, the following briefly introduces the accompanying drawings required for describing the embodiments or the prior art. Apparently, the accompanying drawings in the following description show only some embodiments of this application, and a person of ordinary skill in the art may still derive other drawings from these accompanying drawings without creative efforts.

DETAILED DESCRIPTION

The technical solutions in the embodiments of this application are clearly and completely described in the following with reference to the accompanying drawings in the embodiments of this application. The described embodiments are merely some rather than all of the embodiments of this application. All other embodiments obtained by a person of ordinary skill in the art based on the embodiments of this application without creative efforts shall fall within the protected scope of this application.

Figure 1:
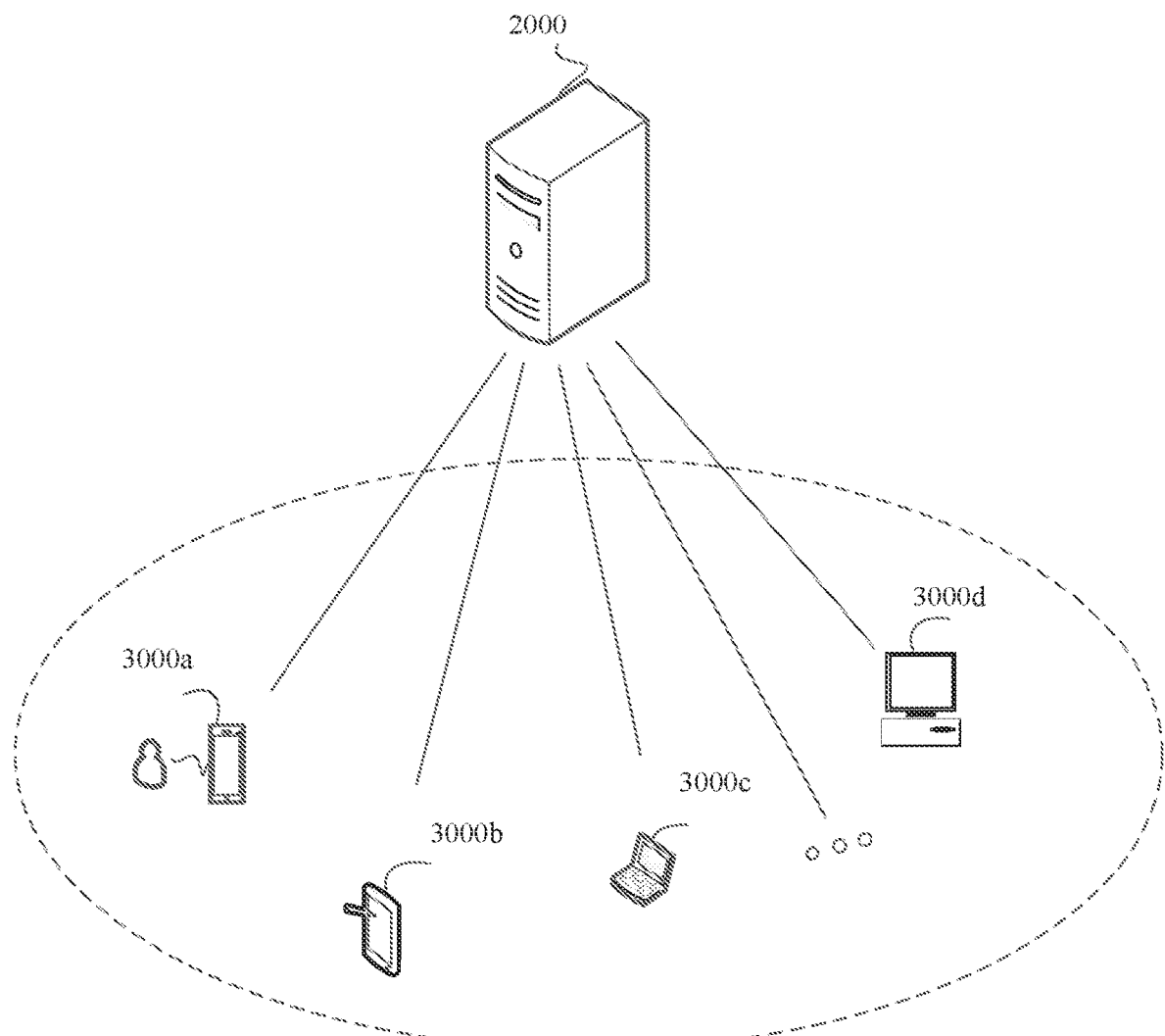
FIG. 1 is a schematic structural diagram of a network architecture according to an embodiment of this application.

Specifically, referring to FIG. 1, FIG. 1 is a schematic structural diagram of a network architecture according to an embodiment of this application. As shown in FIG. 1 the network architecture may include a server 2000 and one or more user terminals. The number of user terminals in a user terminal cluster is not limited herein. As shown in FIG. 1, the user terminals may specifically include a user terminal 3000a, a user terminal 3000b, a user terminal 3000c, . . . , and a user terminal 3000n. The one or more user terminals may establish a direct or indirect network connection to the server 2000 via wired or wireless communication, respectively, so that each user terminal may exchange data with the server 2000 via the network connection. The server 2000 may be an independent physical server, or may be a server cluster or distributed system including a plurality of physical servers, or may be configured as a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The user terminal includes: a smart terminal with a data processing function, such as a smartphone, a tablet computer, a notebook computer, a desktop computer, a smart television, a smart watch, a smart speaker, or a vehicle-mounted device. It is to be understood that each user terminal shown in FIG. 1 may be installed with an application client. In some embodiments, the application client has a data processing function. When running in each user terminal, the application client may exchange data with the server 2000 shown in FIG. 1. The application client includes: an in-vehicle client, a smart home client, an entertainment client (e.g. game client), a multimedia client (e.g. video client), a social networking client, and an information client (e.g. news client), etc.

A local service (where the local service is used to provide a local key escrow solution) is built in the user terminals shown in FIG. 1. When the local service is started in the user terminal, the application client in the user terminal sends a service calling request to the local service (i.e., the local service in the user terminal is used to serve the application client), so as to realize data communication between the local service and the application client in the user terminal. The data communication between the local service and the application client in the user terminal is realized through inter-process communication.

It can be understood that the server 2000 shown in FIG. 1 is installed with the application client and built with the local service (where the local service is used to provide a local key escrow solution). When the local service is started in the server 2000, the application client in the server 2000 may send a service calling request to the local service (i.e., the local service in the server 2000 is used to serve the application client), so as to realize data communication between the local service and the application client in the server 2000. The data communication between the local service and the application client in the server 2000 may be realized through inter-process communication. In this way, after the data communication between the local service and the application client in the server 2000, data exchange between the application client in the server 2000 (e.g., application client C1) and the application client in the user terminal (e.g., application client C2) may be realized, thereby realizing data exchange between the server 2000 and the user terminal.

The trusted computing-based local key escrow method provided in the embodiments of this application may relate to the field of cloud technology. The cloud technology is a hosting technology that unifies a series of resources such as hardware, software, and network resources in a wide area network or a local area network to implement data computing, storage, and processing.

The trusted computing-based local key escrow method disclosed in this application may be applied to a blockchain system, and the server 2000 shown in FIG. 1 may be a blockchain node in the blockchain system. Service scenarios of the blockchain system may include: an electronic bill scenario, a social networking scenario, an on-credit purchase scenario, a loan scenario, a payment scenario, etc., each and every specific type of the service scenarios will not be enumerated herein. In this case, transaction data in the corresponding service scenario (e.g., to-be-encrypted data indicated by the service data) may specifically include:

electronic bill information in the electronic bill scenario, data exchange information in the social networking scenario, item order information in the on-credit purchase scenario, loan data information in the loan scenario, an asset flow record in the payment scenario, etc., each and every specific content of the transaction data in the corresponding service scenarios will not be enumerated herein. In a case that a private key of a user is stored in an enclave container created in a trusted environment, before the application client of the user writes service data carrying personal privacy information (i.e., to-be-encrypted data) into the blockchain, the to-be-encrypted data to be added to the blockchain may be signed in advance through the local service framework built locally to generate corresponding signature information, and the signature information and the to-be-encrypted data may be encrypted together using a local key derived from the enclave container to obtain encrypted service data. In this way, when obtaining the encrypted service data, the application client can send the encrypted service data carrying the signature information to a packing node in the blockchain network, so that the packing node may broadcast a block containing the encrypted service data to consensus nodes in the blockchain network for block consensus. When the consensus nodes reach a block consensus, the packing node is allowed to write the block containing the encrypted service data into the blockchain. It is to be understood that in the embodiments of this application, by writing the encrypted service data for the user into the blockchain, the security and privacy of the service data carrying the personal privacy information stored on the blockchain can be ensured.

It is to be understood that the trusted computing involved in the embodiments of this application is a trusted computing technology based on the support of hardware security modules widely used in computers and communication systems to improve the overall security of the system. The trusted computing technology provides an encrypted trusted execution area (i.e., a security area provided by a trusted execution environment (TEE)) in an internal memory. A central processing unit (CPU) may protect data in the trusted execution area from being stolen by malicious code, thereby ensuring the confidentiality, privacy and integrity of the data in the trusted execution area.

It is to be understood that different platforms implement the trusted execution area using different trusted computing technologies. For example, the trusted computing technology used to implement the trusted execution area on an Acorn RISC Machine (ARM) platform is Trust Zone, the trusted computing technology used to implement the trusted execution area on an Intel platform is Intel Software Guard Extensions (SGX). Each and every trusted computing technology will not be enumerated herein. For ease of understanding, the embodiments of this application are illustrated by using an example where the trusted computing technology is the SGX technology.

It is to be understood that protection based on hardware information has high security. In some embodiments, the protection based on hardware information may also be protection of data by collecting hardware fingerprints. The hardware fingerprint refers to information that can be used to uniquely identify a certain hardware. When a firmware is stable, a fixed program can run in the environment to which the firmware belongs. In this way, hardware information (such as hard disk serial number, MAC address, etc.) may be bound to the program.

Figure 2:
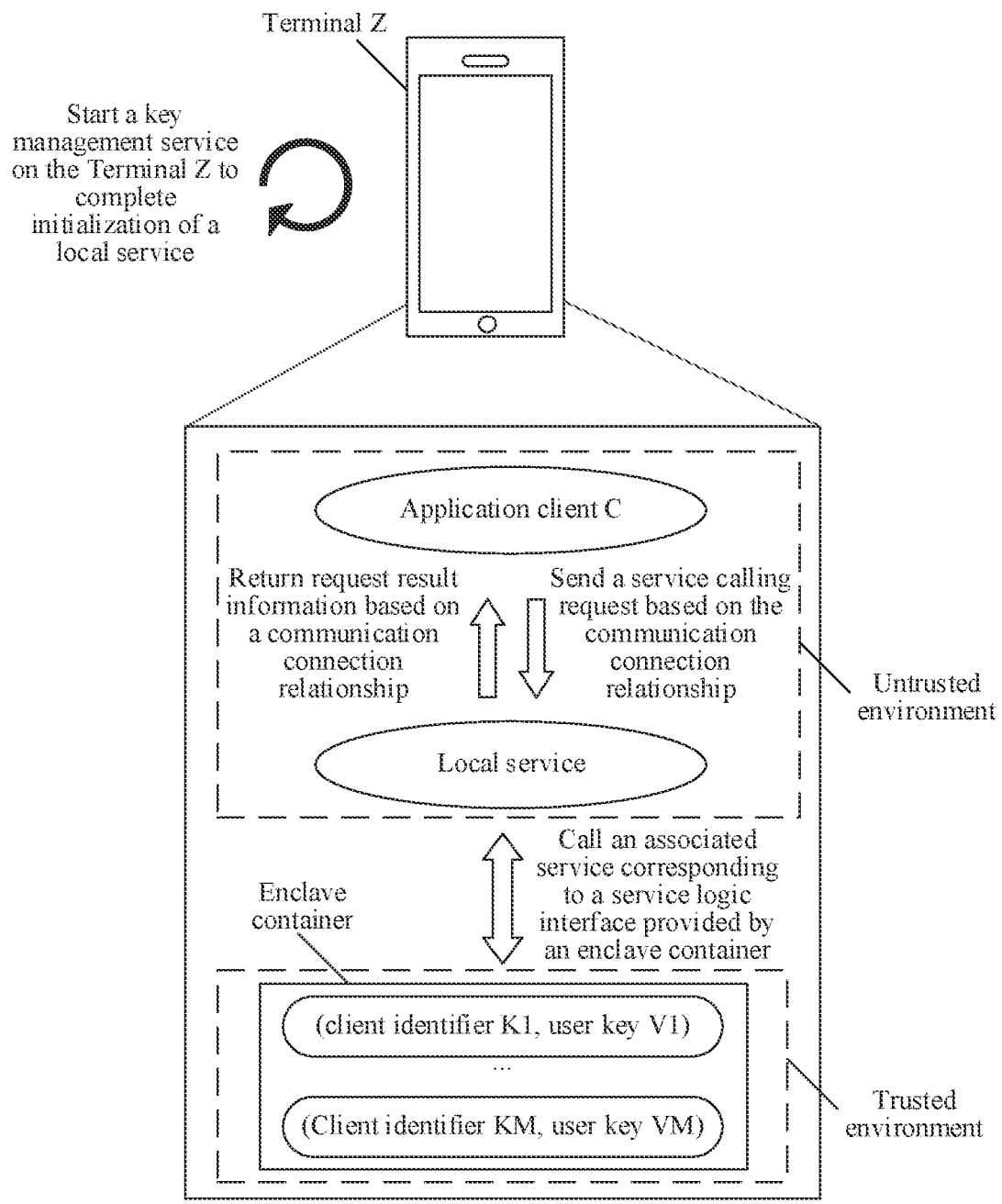
FIG. 2 is a schematic diagram of a data communication scenario according to an embodiment of this application.

For ease of understanding, further, referring to FIG. 2, FIG. 2 is a schematic diagram of a data communication scenario according to an embodiment of this application. a terminal Z shown in FIG. 2 may be any user terminal in the embodiment corresponding to FIG. 1. For ease of understanding, an example where the terminal Z is the user terminal 3000a shown in FIG. 1 is used in the embodiments of this application to explain the implementation of data exchange between the application client C and the local service in the terminal Z. It is to be understood that the application client C herein may be any one of a plurality of application clients on the terminal Z, and the local service herein may include a trusted storage service indicated by a trusted environment and a key management service indicated by an untrusted environment. A local internal memory of the terminal Z may include a trusted environment and an untrusted environment. In the terminal Z, both the application client C and the local service for providing the key management service run in the untrusted environment, and another local service for providing the trusted storage service runs in the trusted environment corresponding to the enclave container.

It can be understood that when the key management service is started in the terminal Z shown in FIG. 2, initialization of the key management service and the trusted storage service may be completed in the terminal Z first, thereby completing initialization of the local service. The initialization of the key management service and the trusted storage service includes the following steps: determining an executable file associated with the untrusted environment and a dynamic link file associated with the trusted environment based on an enclave interface definition file associated with trusted computing, so that when the dynamic link file is linked to the executable file, an enclave container may be created in the trusted environment; and determining an environment access interface associated with the enclave container based on an obtained container identifier of the enclave container, thereby completing the initialization of the key management service on the terminal Z. Therefore, when a sealed data file is copied from the untrusted environment to the trusted environment, the sealed data file may be decrypted and deserialized in the enclave container through the environment access interface to obtain service data requested by the application client, thereby completing the initialization of the trusted storage service in the terminal Z.

The application client herein may include the application client C shown in FIG. 2, and may also include an application client C1, an application client C2, . . . , and an application client CN. Therefore, the enclave container may be used for storing service data requested by the application client C, the application client C1, the application client C2, . . . , and the application client CN. The number of application clients is not limited herein, and N is an integer greater than 1.

The enclave container may be used for storing a key-value pair including a client identifier and a user key. The enclave container shown in FIG. 2 may include M key-value pairs, where M may be a positive integer. The M key-value pairs may specifically include: (client identifier K1, user key V1), . . . , and (client identifier KM, user key VM), where (client identifier K1, user key V1) may be a key-value pair associated with the application client C. The number of key-value pairs associated with the application client C is not limited herein.

The initialization of the local service can be understood as: when the key management service is started in the terminal Z shown in FIG. 2, a service process associated with the key management service (which can also be referred to as a server-side process) may be run on the terminal Z. A communication socket for local inter-process communication may be created through this service process (where the communication socket may be a domain socket). It can be understood that, when a resource handle (i.e., instance) of a file resource descriptor management tool (e.g., EPOLL) is already created in the service process, the communication socket may be registered on the resource handle, and the communication socket may be efficiently monitored through the resource handle, thereby completing the initialization of the local service in the terminal Z.

It is to be understood that, when the application client C is started in the terminal Z shown in FIG. 2, a client process of the application client C may be run on the terminal Z. In this way, when the application client C needs to request the built local service for calling a service, first, a local socket for local inter-process communication is created by the client process (the local socket can be a domain socket), and a process connection request is sent to the communication socket based on the local socket, so that a communication connection relationship between the client process and the service process may be established. It is to be understood that client processes of the plurality of application clients may establish a communication connection relationship with the same service process.

Further, as shown in FIG. 2, the client process may send a service calling request to the service process based on the communication connection relationship. It is to be understood that when the service process receives the service calling request sent by the client process, the service process may parse a service data packet carried in the service calling request, to obtain service data requested by the client process. It can be understood that the service process may determine an associated service requested by the application client C based on the service data requested by the client process, and then acquire service logic interfaces provided by the enclave container and call the service logic interface corresponding to the associated service.

If the associated service requested by the application client C is a key generation service, the service process calls a second service logic interface corresponding to the key generation service, and then generates a key-value pair, for example (client identifier K(M+1), user key V(M+1)), associated with the application client C in the enclave container. Based on the key-value pair (client identifier K(M+1), user key V(M+1)), request result information corresponding to key success indication information is generated. Therefore, the service process may acquire the request result information returned from the enclave container and return the request result information to the client process based on the communication connection relationship.

It can be understood that if the associated service requested by the application client C is a data encryption service, the service process may call a first service logic interface corresponding to the data encryption service, and then acquire a key-value pair, for example (client identifier K1, user key V1), associated with the application client C in the enclave container. To-be-encrypted data indicated by the service data is encrypted based on the user key V1 in the key-value pair (client identifier K1, user key V1) to obtain encrypted service data, and request result information may be generated based on the encrypted service data. Therefore, the service process may acquire the request result information returned from the enclave container and return the request result information to the client process based on the communication connection relationship. Taking the data encryption service as an example, if the encryption is successful, the request result information is encryption success indication information, and if the encryption fails, the request result information is encryption failure indication information.

It can be understood that, if the associated service requested by the application client C is a data decryption service, the service process may call a third service logic interface corresponding to the data decryption service. It is to be understood that for the specific process of decrypting to-be-decrypted data indicated by the service data in the enclave container, reference may be made to the above description of the encryption of the to-be-encrypted data indicated by the service data, and the details will not be described here.

It is to be understood that the associated service requested by the application client C includes but is not limited to the key generation service, the data encryption service, the data decryption service and a local signature service. Each and every specific type of the associated services will not be enumerated herein. It is to be understood that after receiving the request result information returned by the local service, the application client C may perform result parsing on the request result information to obtain request result data.

Figure 3:
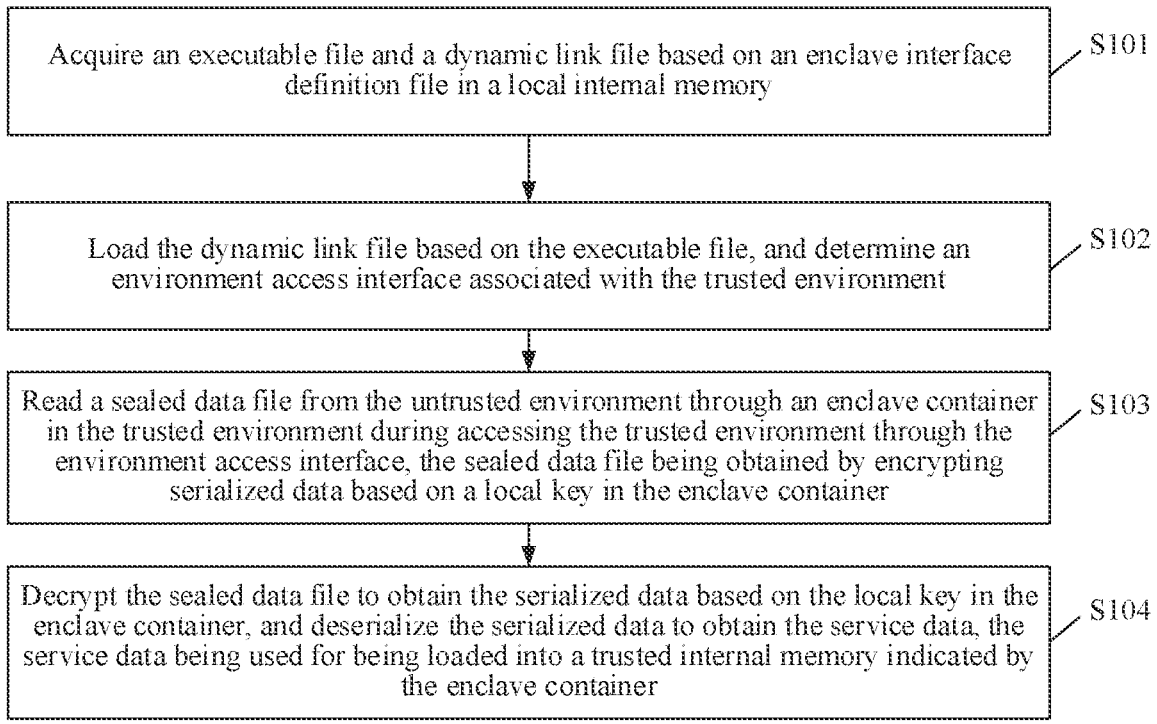
FIG. 3 is a schematic flowchart of a trusted computing-based local key escrow method according to an embodiment of this application.

Further, referring to FIG. 3, FIG. 3 is a schematic flowchart of a trusted computing-based local key escrow method according to an embodiment of this application. The method may be performed by a user terminal (e.g., the user terminal 3000a shown in FIG. 1 above), a server (e.g., the server 2000 shown in FIG. 1), or jointly by a user terminal and a server. For ease of understanding, this embodiment is illustrated using an example where the method is performed by a user terminal. It is to be understood that the user terminal may include an application client (e.g., the application client C shown in FIG. 2) and a local service (e.g., the local service shown in FIG. 2). The trusted computing-based local key escrow method may include at least the following steps S101 to S104.

Step S101. Acquire an executable file and a dynamic link file based on an enclave interface definition file in a local internal memory, the enclave interface definition file being used for environment compilation, the executable file being associated with untrusted environment, and the dynamic link file being associated with a trusted environment.

In the embodiments of this application, the enclave interface definition file is a file stored in an internal memory in advance, and contains interface definition data for compiling a trusted environment and an untrusted environment. The enclave interface definition file is associated with a corresponding service, and when the corresponding service is started, the processing of the step S101 is triggered.

In some embodiments, when a key management service is started in the user terminal, the user terminal acquires the enclave interface definition file for environment compilation in the local internal memory, and compiles untrusted binding data corresponding to the untrusted environment and trusted binding data corresponding to the trusted environment based on interface definition data in the enclave interface definition file. The untrusted binding data includes an untrusted header file and an untrusted source file, and the trusted binding data includes a trusted header file and a trusted source file. The user terminal acquires a request receiving file used for receiving a user calling request in the untrusted environment, and compiles the executable file associated with the untrusted environment based on the request receiving file, the untrusted header file, and the untrusted source file. The user terminal compiles the dynamic link file associated with the trusted environment based on the trusted header file and the trusted source file.

It can be understood that the enclave interface definition file (e.g., SGX_KMS.edl) may be implemented using an Enclave Definition Language (EDL). A compiler tool is used to compile interface definition data in the enclave interface definition file into trusted binding data (i.e., reference code of a trusted part) and untrusted binding data (i.e., reference code of an untrusted part). The reference code of the trusted part and the reference code of the untrusted part have no specific logic, and mainly deal with the safe passing of parameters between the trusted environment and the untrusted environment. When the reference code of the trusted part is introduced into the trusted environment and the reference code of the untrusted part is introduced into the untrusted environment, the data communication between the trusted environment and the untrusted environment can be realized.

It is to be understood that, in the embodiments of this application, the local internal memory may be divided into the trusted environment and the untrusted environment, the local internal memory indicated by trusted environment is a trusted internal memory, the local internal memory indicated by the untrusted environment is an untrusted internal memory, the trusted environment and the untrusted environment are completely isolated, passing of parameters from the trusted environment to the untrusted environment and from the untrusted environment to the trusted environment involves copying between the internal memories. The copying between the internal memories herein can be understood as deep copy.

Step S102. Load the dynamic link file based on the executable file, and determine an environment access interface associated with the trusted environment.

In some embodiments, the user terminal configures a file path of the dynamic link file in the untrusted environment, and dynamically links the dynamic link file to the executable file based on the file path of the dynamic link file. The user terminal creates an enclave container containing a startup token in the trusted environment. A local service indicated by the untrusted environment includes a key management service; a local service indicated by the trusted environment includes a trusted storage service; and the startup token being used for indicating that both the key management service and the trusted storage service have passed signature verification. The user terminal determines the environment access interface associated with the enclave container based on a container identifier of the enclave container. The container identifier of the enclave container may be obtained in the process of creating the enclave container, may be determined at the time of starting the creation, or may be determined after the creation is completed.

The signature verification between the key management service and the trusted storage service is used to confirm permission of the key management service and the trusted storage service to access each other. In this way, the application client calls the key management service, and then calls the trusted storage service through the key management service, thereby realizing the calling of the trusted storage service by the application client.

It can be understood that, both the executable file and the dynamic link file are Executable Linkable Format (ELF) files. In a case that the dynamic link file and the executable file belong to the same file directory, the executable file directly loads the dynamic link file. In a case that the dynamic link file and the executable file belong to different file directories, the executable file loads the dynamic link file based on a file path of the dynamic link file. The file paths of the dynamic link file and the executable file are not limited in the embodiments of this application.

It can be understood that, the local service in the embodiments of this application can be understood as a security management service. The security management service may create and manage (e.g., store) a key of a user (e.g., a user H corresponding to the user terminal) through the key management service and the trusted storage service, and protect the confidentiality, integrity and availability of the key, so as to meet key management requirements of the user H for multiple applications and multiple services. In addition, the security management service may also encrypt and decrypt the data of the user using the key. Each and every type of services provided by the local service are not enumerated herein.

It is to be understood that the key management service can be understood as a local key manager server (KMS) service. The local KMS service belongs to an untrusted area (i.e., the untrusted internal memory indicated by the untrusted environment), is not used for storing keys, and provides a service interface for the application clients used by the user by encapsulating functions of the trusted storage service. The trusted storage service (i.e., SGX_KMS) can be understood as an SGX module in the trusted computing technology (where the SGX module may create an enclave container in the trusted environment). The SGX module belongs to a trusted area (i.e., the trusted internal memory indicated by the trusted environment), may be used for storing keys, and encapsulates basic operations related to keys. Regardless of a privilege level and mode of a CPU, the untrusted environment cannot write data into or read data from the trusted internal memory indicated by the trusted environment.

Figure 4:
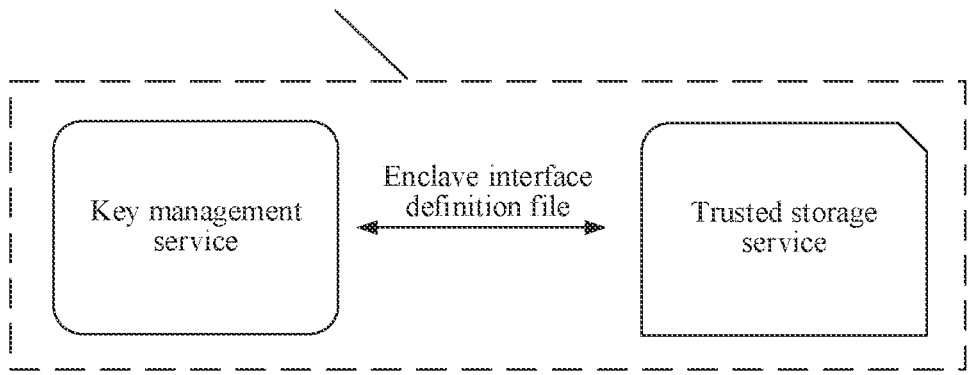
FIG. 4 is a schematic structural diagram of a local service according to an embodiment of this application.

For ease of understanding, referring to FIG. 4, FIG. 4 is a schematic structural diagram of a local service according to an embodiment of this application. The local service built in the embodiments of this application may include a key management service (i.e., Local KMS) and a trusted storage service (i.e., SGX_KMS) shown in FIG. 4. An enclave interface definition file shown in FIG. 4 is an SGX_KMS.edl file. The key management service is a local service indicated by the untrusted environment, and the trusted storage service is a local service indicated by the trusted environment.

It can be understood that by compiling the SGX_KMS.edl file, untrusted binding data corresponding to the key management service and trusted binding data corresponding to the trusted storage service are obtained. The untrusted binding data includes a untrusted function in interface definition data, and the trusted binding data includes a trusted function in the interface definition data. The trusted function and the untrusted function can call each other. The trusted function may be called in the untrusted environment by the untrusted function and executed in the trusted environment. The untrusted function may be called in the trusted environment by the trusted function and executed in the untrusted environment. Through the calling relationship between the trusted function and the untrusted function, the mutual calling between the key management service and the trusted storage service shown in FIG. 4 can be realized.

Figure 5:
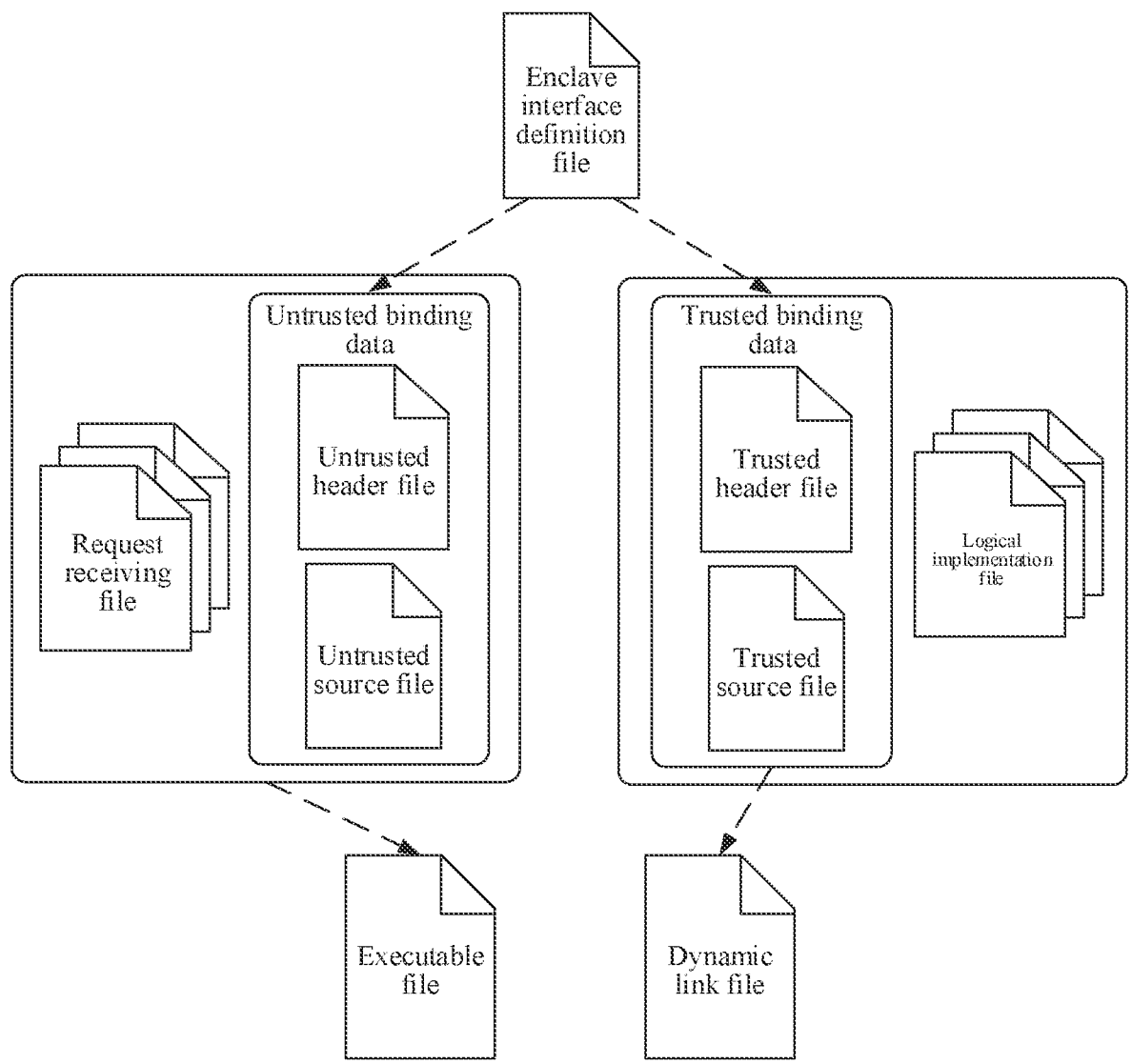
FIG. 5 is a schematic diagram of a scenario for implementing a local service according to an embodiment of this application.

For ease of understanding, referring to FIG. 5, FIG. 5 is a schematic diagram of a scenario for implementing a local service according to an embodiment of this application. The enclave interface definition file shown in FIG. 4 may be an SGX_KMS.edl file, an untrusted header file may be an SGX_KMS_u.h file, an untrusted source file may be an SGX_KMS_u.c file, a trusted header file may be an SGX_KMS_t.h file, a trusted source file may be an SGX_KMS_t.c file, a request receiving file may be a KMS.cpp file, and a logical implementation file may be an SGX_KMS.cpp file.

The numbers of the request receiving files, the untrusted header files, the untrusted source files, the trusted header files, the trusted source files, and the logical implementation files may be one or more, and are not limited herein.

As shown in FIG. 5, by compiling the SGX_KMS.edl file, untrusted binding data corresponding to the untrusted environment and trusted binding data corresponding to the trusted environment may be obtained. The untrusted binding data may include an SGX_KMS_u.h file and an SGX_KMS_u.c file, and the trusted binding data may include an SGX_KMS_t.h file and an SGX_KMS_t.c file. By compiling the SGX_KMS_u.h file, the SGX_KMS_u.c file, and the KMS.cpp file in the untrusted environment, an executable file may be obtained. The executable file herein may be a KMS file. By compiling the SGX_KMS_t.h file and the SGX_KMS_t.c file in the trusted environment, a dynamic link file may be obtained. The dynamic link file herein may be an SGX_KMS. so file.

In this way, when a local application client on a user terminal calls a service (e.g., a key generation service) provided by the local service, the application client may load the SGX_KMS. so file based on the KMS file to call an interface provided by the trusted environment, and then call the SGX_KMS.cpp file based on the SGX_KMS. so file to implement the key generation service requested by the application client in the trusted environment. Different methods are defined in the SGX_KMS. so file. The different methods in the SGX_KMS. so file may be called (i.e., different interfaces provided by the trusted environment may be called) by loading the SGX_KMS. so file.

It is to be understood that when an enclave container is created in the trusted area, different interfaces provided by the enclave container may be called based on a container identifier of the enclave container. It can be understood that after the enclave container is created in the trusted area, an initialization interface provided by the enclave container (i.e., an environment access interface) may be called to implement the initialization of the enclave container in the trusted environment. The initialization of the enclave container may include the following steps S103 and S104.

Step S103. Read a sealed data file from the untrusted environment through an enclave container in the trusted environment during accessing the trusted environment through the environment access interface, the sealed data file being obtained by encrypting serialized data based on a local key in the enclave container.

The serialized data is obtained by serializing service data requested by the application client in the enclave container.

It is to be understood that in order to ensure the security of the service data in the enclave container, SGX provides a data sealing mechanism to persist service data in the enclave container in the logical implementation file shown in FIG. 5, and save the persisted service data to the untrusted environment (i.e., a user environment). It can be understood that the persistence of the service data can ensure that the state and the service data of the enclave container are saved when the local service is disabled (i.e., the key management service in the local service is disabled normally or abnormally), and the state and the service data of the enclave container are restored to the previous state after the local service is restarted.

The SGX technology provides two data sealing methods, one using an enclave identity (i.e., MRENCLAVE, security area identifier), and the other using a signer identity (i.e., MRSIGNER, sealing identifier). For the MRENCLAVE method, a unique local key of the security area (i.e., enclave container) may be generated, and only the same security area of the same computer can decrypt the sealed data file. For the MRSIGNER method, a local key, and only the same security based on a signature key of a developer (e.g., Intel), and different security areas on the same computer can decrypt the sealed data file. It is to be understood that the MRSIGNER method is used as the data sealing mechanism in the embodiments of this application, and for the MRSIGNER method, a unique local key can be derived from CPU hardware. It is to be understood that the data sealing method is not limited in the embodiments of this application.

It is to be understood that the persistence of the service data may be triggered in response to disabling the local service in the user terminal. By disabling the key management service indicated by the untrusted environment, the local service is disabled in the user terminal. In this way, when the key management service indicated by the untrusted environment is disabled, the user terminal serializes the service data stored in the trusted internal memory in the enclave container to obtain the serialized data corresponding to the service data. The user terminal acquires the local key in the enclave container, encrypting the serialized data based on the local key to obtain a sealed data file, and release the enclave container in the trusted environment. The sealed data file is used for being copied to an untrusted internal memory indicated by the untrusted environment.

It is to be understood that the persistence of the service data may be triggered when the application client calls a key creation interface provided by the enclave container, to protect the integrity of the service data in the enclave container in the event of an unexpected exit of the local service. In this way, when the application client calls the key creation interface provided by the enclave container, the user terminal may serialize the service data stored in the trusted internal memory in the enclave container to obtain the serialized data corresponding to the service data. The user terminal acquires the local key in the enclave container, and encrypts the serialized data based on the local key to obtain a sealed data file, the sealed data file being used for being copied to an untrusted internal memory indicated by the untrusted environment. In this case, there is no need to release the enclave container in the trusted environment.

It can be understood that the user terminal stores the sealed data file at a local terminal, which includes an untrusted environment of a local internal memory and a local disk (e.g. solid-state hard drive, mechanical hard drive, etc.), so as to load the sealed data file into a trusted environment of the local internal memory when the sealed data file needs to be used. In some embodiments, the user terminal stores the sealed data file in an external disk (e.g., an optical disk, a USB flash drive, a removable hard disk, etc.), so as to load the sealed data file to a local disk when the sealed data file needs to be used. It is to be understood that the storage location of the sealed data file is not limited in the embodiments of this application.

Figure 6:
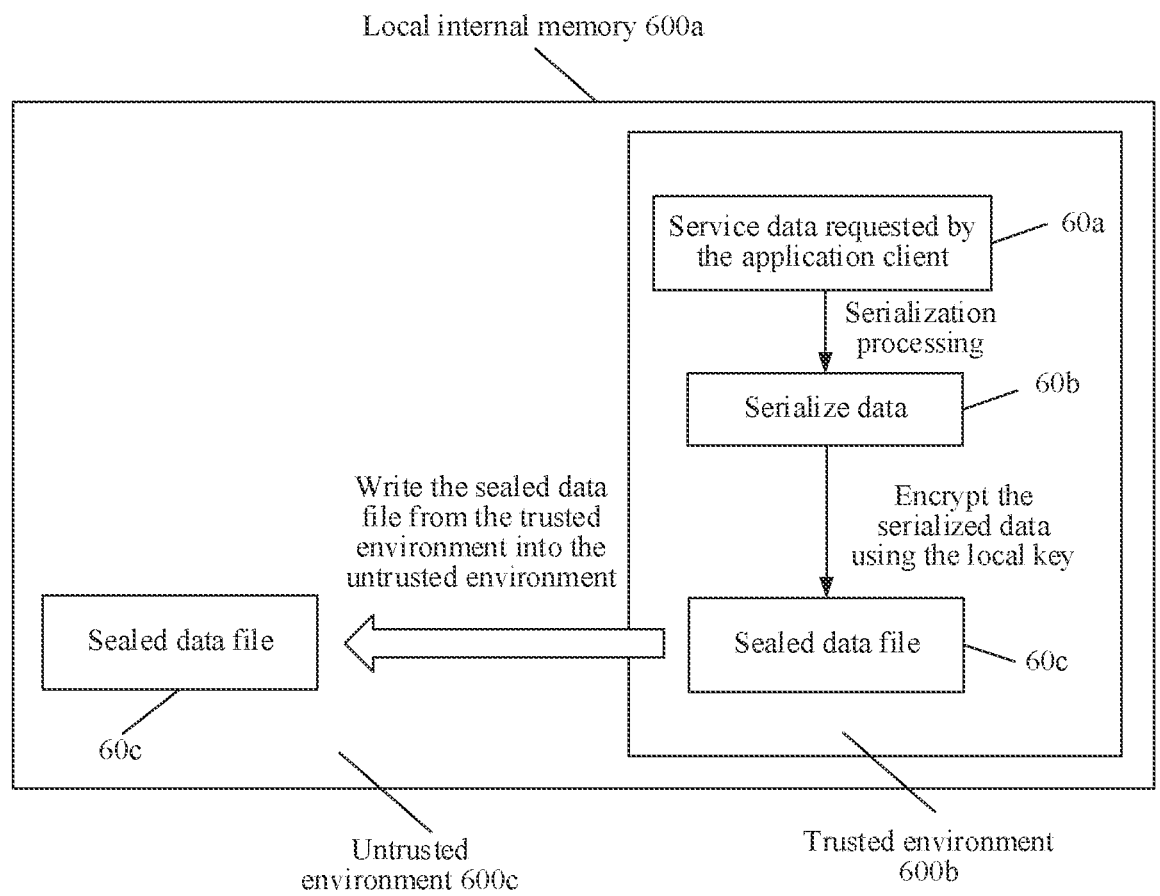
FIG. 6 is a schematic diagram of a scenario for generating a sealed data file according to an embodiment of this application.

For ease of understanding, referring to FIG. 6, FIG. 6 is a schematic diagram of a scenario for generating a sealed data file according to an embodiment of this application. A local internal memory 600a shown in FIG. 6 may be divided into a trusted environment 600b and an untrusted environment 600c. An enclave container is created in the trusted environment 600b.

As shown in FIG. 6, when persistence of service data is triggered, the user terminal may acquire service data 60a requested by the application client in the enclave container of the trusted environment 600b, and serialize the service data 60a requested by the application client to obtain serialized data 60b. The serialized data 60b is encrypted using a local key to obtain a sealed data file 60c. The sealed data file 60c may then be written from the trusted environment 600b to the untrusted environment 600c, that is, copied from a trusted internal memory indicated by the trusted environment 600b to an untrusted internal memory indicated by the untrusted environment 600c.

Step S104. Decrypt the sealed data file to obtain the serialized data based on the local key in the enclave container, and deserialize the serialized data to obtain the service data, the service data being used for being loaded into a trusted internal memory indicated by the enclave container.

In the above step S104, the local key is acquired from the enclave container, the sealed data file is decrypted using the local key to obtain the serialized data, and the serialized data is deserialized to obtain the service data for being loaded into a trusted internal memory indicated by the enclave container.

Figure 7:
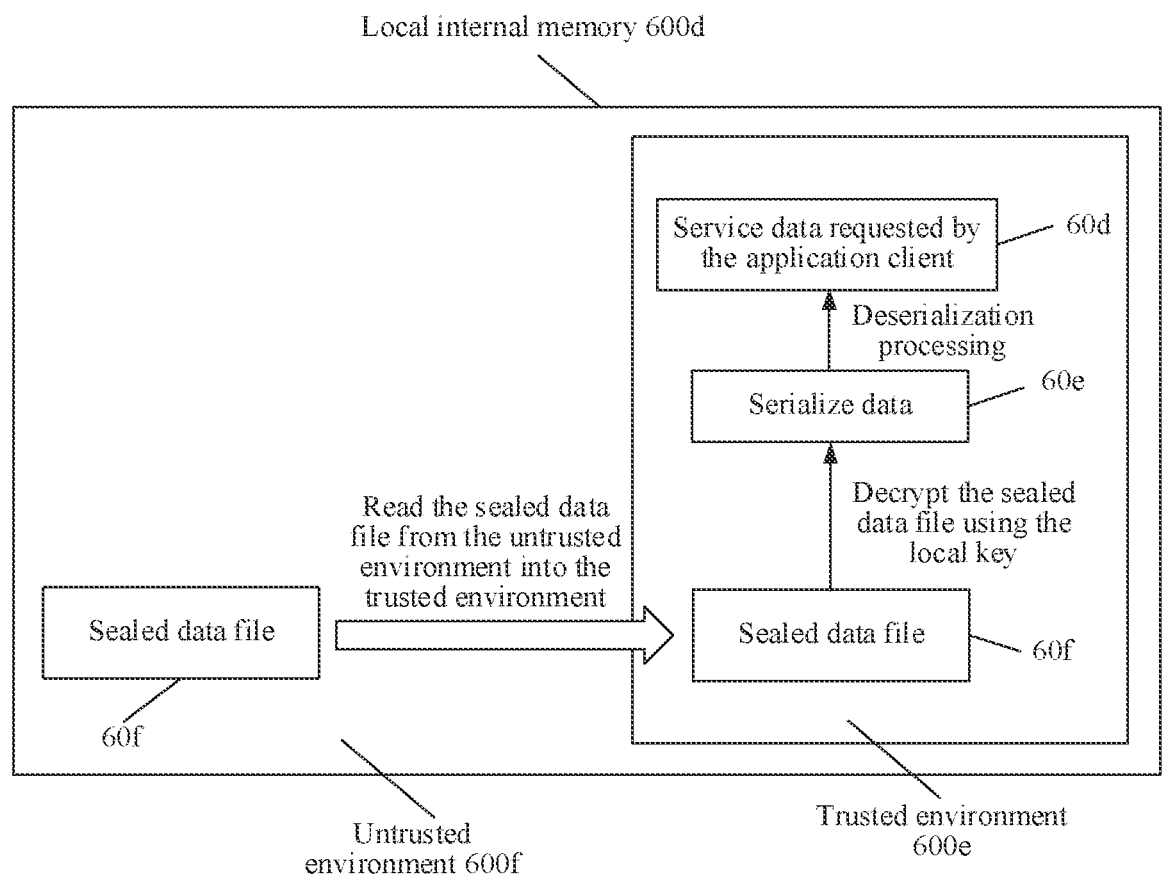
FIG. 7 is a schematic diagram of a scenario for reading a sealed data file according to an embodiment of this application.

For ease of understanding, referring to FIG. 7, FIG. 7 is a schematic diagram of a scenario for reading a sealed data file according to an embodiment of this application. A local internal memory 600d shown in FIG. 7 may be divided into a trusted environment 600e and an untrusted environment 600f. An enclave container is created in the trusted environment 600e.

As shown in FIG. 7, when initialization of the enclave container is triggered, the user terminal acquires a sealed data file 60f in the untrusted environment 600f, reads the sealed data file 60f from the untrusted environment 600f into the trusted environment 600e, that is, copies the sealed data file 60f from an untrusted internal memory indicated by the untrusted environment 600f to a trusted internal memory indicated by the trusted environment 600e. The sealed data file 60f is decrypted using the local key to obtain serialized data 60e, and the serialized data 60e is deserialized to obtain the service data 60d requested by the application client.

It is to be understood that in response to loading the service data into the trusted internal memory indicated by the enclave container, the user terminal parses the service data into a key value pair including a client identifier and a user key based on a data parsing format corresponding to the trusted internal memory. The user key is generated by a data encryption program in the enclave container in response to a request of the application client for calling a service logic interface provided by the enclave container, and the client identifier being used for identifying an identity of the application client in the untrusted environment.

The client identifier may be expressed as KeyID (i.e., Key), and the user key may be expressed as Key (i.e., value), that is, the service data may be parsed into a form of KeyID-Key (i.e., (KeyID, Key)). The client identifier can identify an identity of the application client, the same application client may correspond to multiple client identifiers, and different client identifiers of the same application client respectively correspond to different user keys. When a user key is created in an enclave container, the enclave container returns a client identifier corresponding to the user key to the application client, so that the application client can save the associated client identifier. In this way, different user keys can be acquired from the enclave container based on different client identifiers when calling of a service of the local service is requested, so as to implement the corresponding service (e.g., data encryption service).

In the embodiments of this application, a computer device provides an efficient local service building framework based on an application scenario of trusted computing, and further provides an efficient local service, for example, a local key escrow service, for an application client through the built local service framework. It can be understood that, in the embodiments of this application, an efficient service program associated with the local service framework to be built may be acquired in the local internal memory (i.e., the enclave interface definition file for environment compilation may be acquired in the local internal memory), and then the enclave interface definition file may be compiled to obtain a dynamic link file associated with a trusted environment and an executable file associated with an untrusted environment. In this way, when the dynamic link file is loaded based on the executable file, a container identifier of an enclave container created in the trusted environment may be acquired, an environment access interface provided by the enclave container may be directly called. During calling the environment access interface, the enclave container created in the trusted environment may be accessed, and a sealed data file obtained by encrypting serialized data based on a local key in the enclave container may be read from the untrusted environment through the enclave container, so as to realize the initialization of the enclave container. It is to be understood that during the initialization, the sealed data file stored in the untrusted environment may be copied to the enclave container of the trusted environment, and then the sealed data file is decrypted and deserialized using the local key derived from the enclave container, to obtain the service data requested by the application client in the enclave container. Based on this, when the local service built on the local terminal is used to provide an efficient local key escrow service for the application client, the service data requested by the application client can be securely and efficiently protected in the enclave container, wherein the service data may include, but is not limited to, a user key requested by the application client. It can be understood that the user key may be specifically used to encrypt service data of other types requested by the application client (i.e., to-be-encrypted data, which may be, for example, data to be sent out through a network). It is to be understood that by utilizing the enclave container created in the trusted environment, the security of the local key can be effectively ensured, so that the security of the service data stored in the trusted internal memory can be ensured when the service data is encrypted and decrypted by the local key derived from the secure and trusted enclave container.

Figure 8:
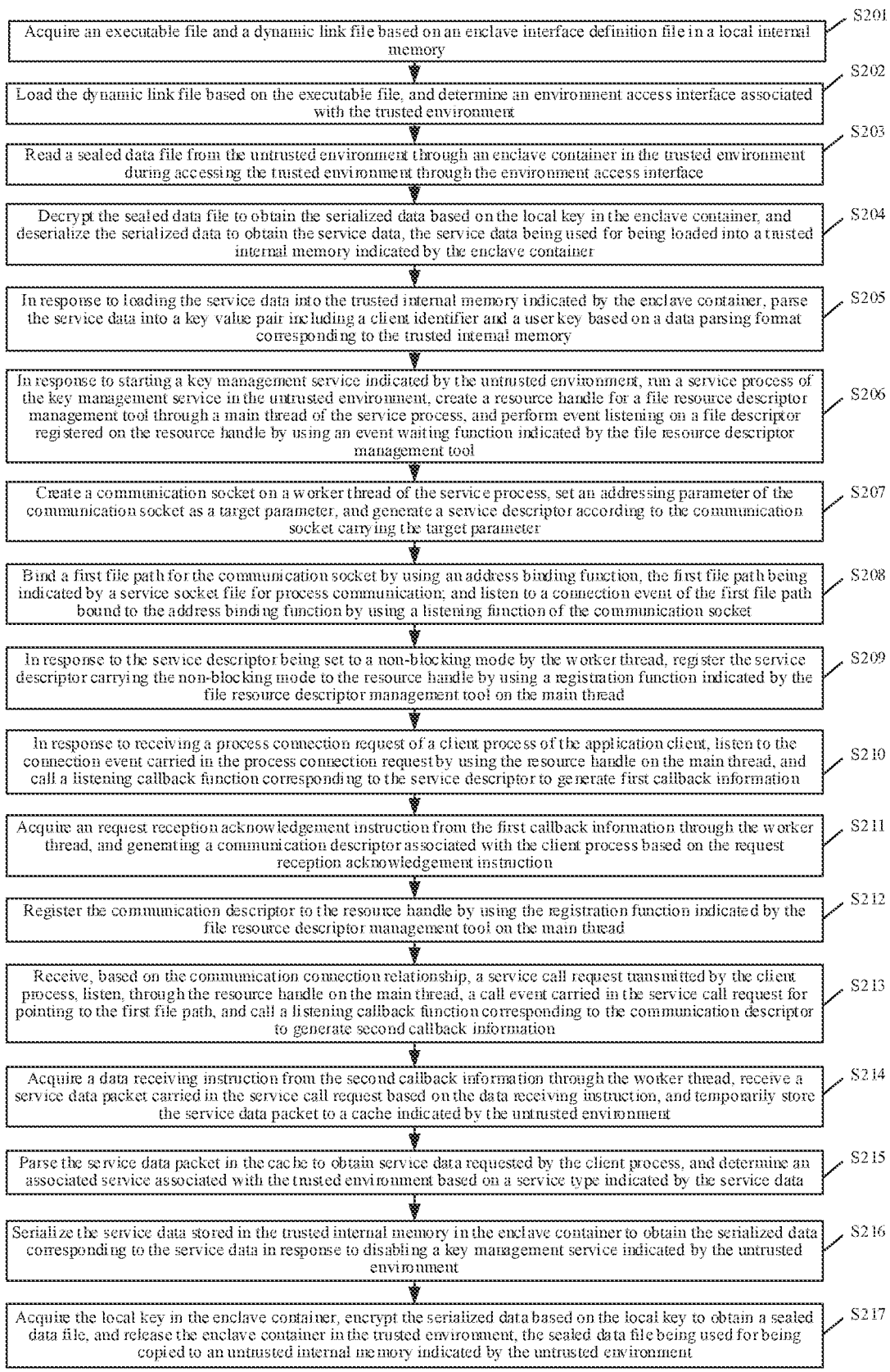
FIG. 8 is a schematic flowchart of a trusted computing-based local key escrow method according to an embodiment of this application.

Further, referring to FIG. 8, FIG. 8 is a schematic flowchart of a trusted computing-based local key escrow method according to an embodiment of this application. The method may be performed by a user terminal (e.g., the user terminal 3000a shown in FIG. 1 above), a server (e.g., the server 2000 shown in FIG. 1), or jointly by a user terminal and a server. For ease of understanding, this embodiment is illustrated using an example where the method is performed by a user terminal. It is to be understood that the user terminal may include an application client (e.g., the application client C shown in FIG. 2) and a local service (e.g., the local service shown in FIG. 2). The trusted computing-based local key escrow method may include the following steps:

Step S201. Acquire an executable file and a dynamic link file based on an enclave interface definition file in a local internal memory, the enclave interface definition file being used for environment compilation, the executable file being associated with untrusted environment, and the dynamic link file being associated with a trusted environment. For step S201, refer to step S101.

Step S202. Load the dynamic link file based on the executable file, and determine an environment access interface associated with the trusted environment. For step S202, refer to step S102.

Step S203. Read a sealed data file from the untrusted environment through an enclave container in the trusted environment during accessing the trusted environment through the environment access interface, the sealed data file being obtained by encrypting serialized data based on a local key in the enclave container. For step S203, refer to step S103.

Step S204. Decrypt the sealed data file to obtain the serialized data based on the local key in the enclave container, and deserialize the serialized data to obtain the service data, the service data being used for being loaded into a trusted internal memory indicated by the enclave container. For step S204, refer to step S104.

Figure 9:
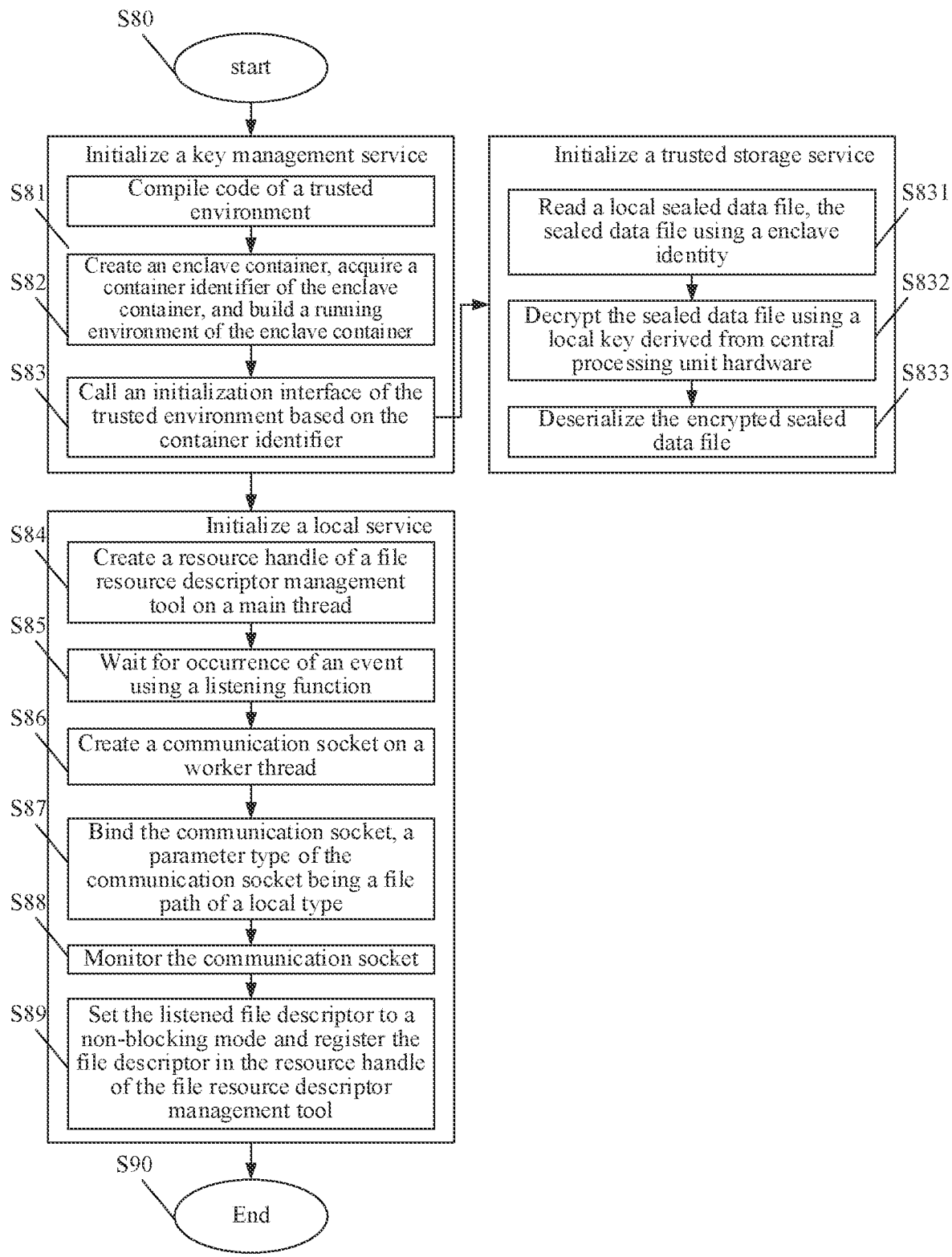
FIG. 9 is a schematic flowchart of implementing a local key management system according to an embodiment of this application.

For ease of understanding, referring to FIG. 9, FIG. 9 is a schematic flowchart of implementing a local key management system according to an embodiment of this application. Step S80 shown in FIG. 9 can be understood as starting a local key management service on a user terminal. When the local key management service is started on the user terminal, the user terminal may perform steps S81 to S83 shown in FIG. 9. Steps S81 to S83 can be understood as performing the above steps S201 to S204. The S81 to S83 can be understood as initializing a key management service and initializing a trusted storage service. Step S83 includes steps S831 to S833.

As shown in FIG. 9, when performing step S81, the user terminal compiles code of the trusted environment, that is, compiles the enclave interface definition file, to obtain untrusted bonding data corresponding to the untrusted environment and trusted bonding data corresponding to the trusted environment, i.e., the code of the trusted environment. After the code of the trusted environment is compiled, the dynamic link file associated with the trusted environment is obtained. After the code of the untrusted environment (i.e., untrusted binding data) is compiled, the executable file associated with the untrusted environment is obtained.

Further, the user terminal performs step S82, to load the dynamic link file based on the executable file, creates an enclave container in the trusted environment by using an instruction provided by the CPU, and acquires a container identifier of the enclave container, so as to access the enclave container based on the container identifier in subsequent steps, thereby constructing a running environment of the enclave container. Further, the user terminal may perform step S83 to call an initialization interface of the trusted environment (i.e., an environment access interface) based on the container identifier acquired in step S82. The initialization interface is used for initializing the enclave container created in the trusted environment.

The process of initializing the enclave container is steps S831 to S833 shown in FIG. 8. When step S831 is performed, the user terminal reads a local sealed data file, where the local sealed data file is obtained based on an enclave identity and stored in the untrusted environment. When step S832 is performed, the user terminal copies the sealed data file from the untrusted environment to the trusted environment, and decrypts the sealed data file in the enclave container based on the local key derived by the CPU, where keys for decrypting and encrypting the sealed data file are both local keys. When step S833 is performed, the user terminal acquires the decrypted sealed data file obtained by the decryption process, and then deserializes the decrypted sealed data file to obtain the service data requested by the application client for storage in the enclave container.

Step S205. In response to loading the service data into the trusted internal memory indicated by the enclave container, parse the service data into a key value pair including a client identifier and a user key based on a data parsing format corresponding to the trusted internal memory, the user key being generated by a data encryption program in the enclave container in response to a request of the application client for calling a service logic interface provided by the enclave container, and the client identifier being used for identifying an identity of the application client in the untrusted environment.

It is to be understood that the service data includes a key-value pair including a client identifier and a user key obtained by parsing, and the service data further includes privacy data of the application client, data that the application client requests to protect, etc., each and every data type of the service data will not be enumerated herein. The client identifier may be used as an index to query the corresponding key-value pair, so as to acquire the user key in the key-value pair.

Step S206. In response to starting a key management service indicated by the untrusted environment, run a service process of the key management service in the untrusted environment, create a resource handle for a file resource descriptor management tool through a main thread of the service process, and perform event listening on a file descriptor registered on the resource handle by using an event waiting function indicated by the file resource descriptor management tool.

It can be understood that, the service process of the key management service is run in the untrusted environment (where this service process can also be referred to as a server-side process). A client process of the application client is also run in the untrusted environment. The service process and the client process implement an inter-process communication (IPC) communication mode based on a socket. When the service process and the client process are two processes on the same user terminal, the service process and the client process implement the IPC communication mode based on a domain socket.

The domain socket is a way to realize inter-process communication on Unix/Linux system. Using the domain socket can achieve higher efficiency than using a network protocol. The domain socket does not need to pass through a network protocol stack, and does not require packing and unpacking, calculating a checksum, maintaining a sequence number, acknowledgement, etc.

It can be understood that, the file resource descriptor management tool can be EPOLL, an EPOLL instance may be created by using a creation function indicated by the resource descriptor management tool EPOLL (i.e., EPOLL_create( ) function), and a file descriptor (e.g. FD1) referencing the EPOLL instance is returned. The EPOLL instance is the resource handle (e.g. the resource handle may EFD). The file resource descriptor management tool can also be POLL, SELECT, etc. The type of the file resource descriptor management tool is not limited in the embodiments of this application. EPOLL is an improved POLL mode, and can be used to process a large number of file descriptors to improve the response efficiency to events.

When the main thread creates the resource handle by using the creation function, a maximum number of file descriptors that the resource handle listens on may be set.

For example, the maximum number may be 16. It is to be understood that, theoretically, the file resource descriptor management tool EPOLL has no limit on the number of file descriptors to listen to, which depends on the response performance of the user terminal. The maximum number may be the largest number of handles (i.e., file descriptors) that an operating system kernel can process correctly.

It can be understood that, based on the event waiting function indicated by the file resource descriptor management tool EPOLL (i.e., the epoll_wait( ) function), the resource handle is used to perform event listening for the file descriptor added to the resource handle. If no event occurs on the file descriptor that the resource handle listens on, the main thread is always blocked; If an event occurs on the file descriptor that the resource handle listens on, the main thread is awakened. It is to be understood that the resource handle can perform various forms of listening on the registered file descriptor. For example, an EPOLLIN event indicates that the corresponding file descriptor can be read (including normal enabling of the client socket), and an EPOLLOUT event indicates that the corresponding file descriptor can be written.

It is to be understood that EPOLL works in either of two ways: edge triggered (ET) mode and level triggered (LT) mode. The ET mode means that when the state changes, a notification is generated, to request the service to read all the data until an error occurs. The LT mode means that as long as there is data in the cache that has not been processed, a new notification is generated. Therefore, the difference between the edge triggered mode and the level triggered mode lies in that: in the level triggered mode, a notification is sent as long as the file descriptor satisfies a certain state, while in the edge triggered mode, a notification is sent only when the state of the file descriptor changes. In the embodiments of this application, the LT mode may be used. It is to be understood that the mode of operation of the EPOLL is not limited in the embodiments of this application.

Step S207. Create a communication socket on a worker thread of the service process, set an addressing parameter of the communication socket as a target parameter, and generate a service descriptor according to the communication socket carrying the target parameter, the target parameter being used for instructing to perform communication between local processes in a same device.

It can be understood that, the communication socket may be created by using a socket creation function (i.e., socket( ) function). When the communication socket is created on the worker thread, a family parameter (i.e., addressing parameter) in the socket( ) function may be set to AF_UNIX (target parameter). The target parameter instructs to create a communication socket for inter-process communication on the same device (where the communication socket is a domain socket). It is to be understood that a socket file may be created in the system by using AF_UNIX, different processes communicate by reading and writing the socket file, and the socket file may be used for informing the client process of the name of the communication socket.

Step S208. Bind a first file path for the communication socket by using an address binding function, the first file path being indicated by a service socket file for process communication; and listen to a connection event of the first file path bound to the address binding function by using a listening function of the communication socket.

It can be understood that a socket type file path (i.e., the first file path indicated by the service socket file) is bound to the communication socket by using the address binding function (i.e., bind( ) function), and the system creates the service socket file based on the first file path, so that the service process sends and receives data through the communication socket.

It can be understood that the listening function (i.e., listen( ) function) is used to enable the communication socket to listen to the first file path, and because the service descriptor (e.g. FD2) corresponding to the communication socket is set to the non-blocking mode (i.e., 0_NONBLOCK mode), the listening operation of the communication socket does not block the worker thread.

Step S209. In response to the service descriptor being set to a non-blocking mode by the worker thread, register the service descriptor carrying the non-blocking mode to the resource handle by using a registration function indicated by the file resource descriptor management tool on the main thread.

The service descriptor belongs to the file descriptor that the resource handle listens on. It can be understood that, the service descriptor may be added to the resource handle by using the registration function indicated by the file resource descriptor management tool EPOLL (i.e., epoll_ctl( ) function) to perform event listening for the service descriptor through the resource handle.

It is to be understood that, the file resource descriptor management tool EPOLL creates a listening queue. The listening queue is used for storing a connection from the client process. Therefore, when the epoll_ctl( ) function is called, the corresponding file descriptor (e.g., service descriptor FD2) can be added to the listening queue, and the service descriptor FD2 and an event to be listened to can be copied from user space to kernel space. This copy process is performed only once.

For convenience of understanding, refer to FIG. 9 again. Steps S84 to S89 shown in FIG. 9 can be understood as performing the above steps S206 to S209. Steps S84-S89 can be understood as initializing the local service. In step S90, building of an environment of the local service is complete, so as to receive a call service request sent by the application client in subsequent steps.

As shown in FIG. 9, in step S84, a resource handle of the file resource descriptor management tool (i.e., the EFD) is created on the main thread. In step S85, wait for occurrence of an event by using a listening function corresponding to the resource handle. Steps S84 and S85 may correspond to the above step S206. In step S86, a communication socket may be created on the worker thread. In step S87, the communication socket may be bound. In step S88, the communication socket is monitored, wherein a parameter type of the communication socket is a file of local type. Steps S86 to S88 may correspond to the above steps S207 to S208. In step S89, the monitored file descriptor (i.e., service descriptor corresponding to the communication socket) is set to the non-blocking mode, and the file descriptor is registered to the resource handle of the file resource descriptor management tool. Step S89 may correspond to the above step S209.

Step S210. In response to receiving a process connection request of a client process of the application client, listen to the connection event carried in the process connection request by using the resource handle on the main thread, and call a listening callback function corresponding to the service descriptor to generate first callback information, the connection event pointing to the first file path.

The process connection request is transmitted by the client process based on a second file path indicated by a local socket file for process communication. The resource handle on the main thread may detect an EPOLLIN event when receiving the process connection request.

Step S211. Acquire a request reception acknowledgement instruction from the first callback information through the worker thread, and generating a communication descriptor associated with the client process based on the request reception acknowledgement instruction. It can be understood that, the worker thread may call an accept function (i.e., accept( ) function) in the first callback information to acquire the request reception acknowledgement instruction, establish a communication connection relationship between the service process and the client process, and generate a service socket associated with the client process (where the service socket can also be referred to as a server-side socket) and a communication descriptor corresponding to the service socket (e.g., FD3). Therefore, the service process performs data communication with the client process through the service socket. Specifically, the service process may perform data communication with a local sockets of the client process through the service socket. The service socket may be created by the worker thread (e.g. thread A1). In some embodiments, the service socket is created by another worker thread (e.g. thread A2) independent of the worker thread (e.g. thread A1).

In some embodiments, when establishing the communication connection relationship between the service process and the client process, the worker thread generates a communication descriptor associated with the client process, and further performs data communication with the client process based on the communication descriptor. The service process performs data communication with local sockets of client processes in parallel through communication sockets. The communication sockets use different communication descriptors to indicate the local sockets with which the data communication is performed.

It can be understood that the service process and the client process may perform data communication by reading and writing file descriptors. Specifically, the service process may read and write a communication descriptor, the client process may read and write a client descriptor (where the client descriptor is the file descriptor corresponding to the local socket), and data communication is implemented between the service process and the client process based on the communication descriptor and the client descriptor.

Step S212. Register the communication descriptor to the resource handle by using the registration function indicated by the file resource descriptor management tool on the main thread. The communication descriptor belongs to the file descriptor that the resource handle listens on. It can be understood that, the communication descriptor may be added to the resource handle by using the registration function indicated by the file resource descriptor management tool EPOLL (i.e., epoll_ctl( ) function) to perform event listening for the communication descriptor through the resource handle.

It is to be understood that the communication descriptor is used for indicating that the service process and the client process successfully establish a communication connection relationship. When the service process and the client process successfully establish a communication connection relationship, the service process may send (i.e., return) data to the client process or receive data sent by the client process based on the communication connection relationship, and similarly, the client process may send data to the service process or receive data sent (i.e., returned) by the service process based on the communication connection relationship.

Step S213. Receive, based on the communication connection relationship, a service call request transmitted by the client process, listen, through the resource handle on the main thread, a call event carried in the service call request for pointing to the first file path, and call a listening callback function corresponding to the communication descriptor to generate second callback information, the service call request being transmitted by the client process based on the communication connection relationship. The resource handle on the main thread may detect an EPOLLIN event when receiving the service calling request.

It is to be understood that, the file resource descriptor management tool EPOLL creates a ready queue (i.e., a ready linked list). The ready queue is used for storing ready file descriptors. When a listening event is triggered for a corresponding file descriptor (e.g., communication descriptor FD3), the communication descriptor FD3 may be activated and added to the ready queue. Therefore, data sent by the client process can be processed by checking the ready queue.

Step S214. Acquire a data receiving instruction from the second callback information through the worker thread, receive a service data packet carried in the service call request based on the data receiving instruction, and temporarily store the service data packet to a cache indicated by the untrusted environment.

It can be understood that, the worker thread may call a receiving function (i.e., read( ) function) in the second callback information to acquire the data receiving instruction, and then receive the service data packet sent by the client process. It is to be noted that, Data carried in the service calling request is present in the form of service data packets, and need to be further parsed. In some embodiments, the data carried in the service calling request may also be service data obtained by parsing. After acquiring the service data packet, the application client first parses the service data packet to obtain the service data, and performs the subsequent calling process based on the service data.

Step S215. Parse the service data packet in the cache to obtain service data requested by the client process, and determine an associated service associated with the trusted environment based on a service type indicated by the service data.

In some embodiments, the user terminal may parse the service data packet in the cache based on the communication connection relationship to obtain the service data requested by the client process, and determine the service type indicated by the service data. Further, if the service type is a data encryption type, the user terminal may acquire service logic interfaces provided by the enclave container based on the container identifier, determine a first service logic interface corresponding to the data encryption type in the service logic interfaces, and determine a data encryption service corresponding to the first service logic interface as the associated service associated with the trusted environment. The data encryption service is used for instructing to encrypt to-be-encrypted data indicated by the service data based on a user key of the application client in the enclave container, and the user key being generated based on a data encryption program in the enclave container. It is to be noted that, the determination of the service type may be performed during the parsing process.

It can be understood that in response to the associated service indicating that the to-be-encrypted data indicated by the service data is successfully encrypted in the enclave container, the user terminal generates encryption success indication information based on encrypted service data obtained by the encryption, and copies the encryption success indication information to the untrusted environment. It is to be understood that during the copying the encryption success indication information to the untrusted environment, the service process may return the encryption success indication information to the client process based on the communication connection relationship, so that the client process performs result parsing on the encryption success indication information.

In some embodiments, in response to the associated service indicating that the to-be-encrypted data indicated by the service data is not successfully encrypted in the enclave container, the user terminal generates encryption failure indication information, and copies the encryption failure indication information to the untrusted environment. It is to be understood that during the copying the encryption failure indication information to the untrusted environment, the service process may return the encryption failure indication information to the client process based on the communication connection relationship, so that the client process performs result parsing on the encryption failure indication information.

In some embodiments, in response to the service type being a key generation type, the user terminal may acquire the service logic interfaces provided by the enclave container based on the container identifier, determine a second service logic interface corresponding to the key generation type in the service logic interfaces, and determine a key generation service corresponding to the second service logic interface as the associated service associated with the trusted environment. The key generation service is used for instructing to generate the user key for encryption processing based on the data encryption program in the enclave container. Further, in response to the associated service indicating that the user key is successfully generated in the enclave container, the user terminal generates key success indication information corresponding to the user key, and copies the key success indication information to the untrusted environment. It is to be understood that during the copying the key success indication information to the untrusted environment, the service process returns the key success indication information to the client process based on the communication connection relationship, so that the client process performs result analysis on the key success indication information.

In some embodiments, in response to the associated service indicating that the user key is not successfully generated in the enclave container, the user terminal generates key failure indication information corresponding to the user key, and copies the key failure indication information to the untrusted environment. It is to be understood that during the copying the key failure indication information to the untrusted environment, the service process may return the key failure indication information to the client process based on the communication connection relationship, so that the client process performs result parsing on the key failure indication information.

Similarly, it can be understood that, if the service type is a data decryption type, the user terminal may acquire service logic interfaces provided by the enclave container based on the container identifier, determine a third service logic interface corresponding to the data decryption type in the service logic interfaces, and determine a data decryption service corresponding to the third service logic interface as the associated service associated with the trusted environment. It can be understood that, for the specific process of decrypting the service data and returning the request result information (e.g. decryption success indication information or decryption failure indication information) to the client process by the user terminal, reference may be made to the above description of the process of encrypting the to-be-encrypted data indicated by the service data and returning the request result information (e.g., encryption success indication information or encryption failure indication information) to the client process by the user terminal, and the details will not be repeated herein.

It is to be understood that the service that the application client requests to call includes but is not limited to the data encryption service, the data decryption service and the key generation service. Each and every associated service that the application client requests to call will not be enumerated herein. It should be understood that the encryption success indication information, the encryption failure indication information, the key success indication information, the key failure indication information, the decryption success indication information and the decryption failure indication information may be collectively referred to as request result information, and each and every request result information associated with the associated services will not be enumerated herein.

The user key generated in the enclave container based on the data encryption program may be a symmetric user key, so that when requesting to call the data encryption service, the application client can use the symmetric user key to encrypt the to-be-encrypted data indicated by the service data; and when requesting to call the data decryption service, the application client can use the symmetric user key to decrypt the to-be-decrypted data indicated by the service data.

In some embodiments, the user key generated in the enclave container based on the data encryption program may be an asymmetric user key. The asymmetric user key may be divided into a user public key and a user private key. The user private key may be stored in the enclave container, and the user public key may be sent to the application client. In this way, the client process may encrypt the service data requested by the application client based on the user public key to obtain encrypted service data, and send the encrypted service data to the service process. The encrypted service data is decrypted in the enclave container by using the user private key to obtain the service data requested by the application client. In addition, the service data requested by the application client may further be signed by the user private key.

It can be understood that the parsing of the service data packet may be splicing, protocol-based parsing, etc. When the service data requested by the client process is obtained, the service process may send the service data to an application layer for processing. In this case, the service data requested by the client process may be copied from the untrusted environment to the trusted environment, so as to perform the data encryption service, the key generation service, the data decryption service, etc. in the enclave container. After the associated service is performed, the request result information may be copied from the trusted environment to the untrusted environment, and the worker thread in the service process may call a sending function (i.e., write( ) function) to return the request result information corresponding to the associated service to the application client.

Figure 10:
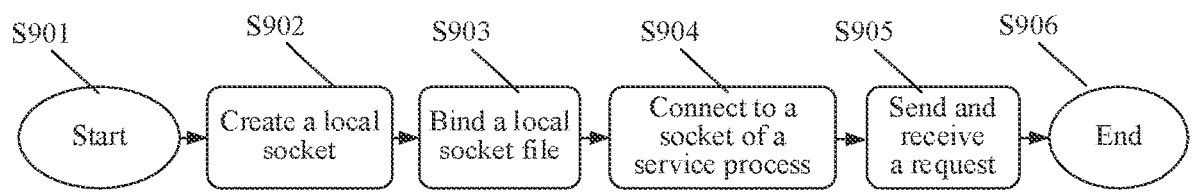
FIG. 10 is a schematic flowchart of implementing a client process logic according to an embodiment of this application.

For ease of understanding, referring to FIG. 10, FIG. 10 is a schematic flowchart of implementing a client process logic according to an embodiment of this application. As shown in FIG. 10, step S901 indicates that when an application client in an untrusted environment is started, a client process of the application client may be run in the untrusted environment. In step S902, the client process may create a local socket by using a socket creation function (i.e., socket( ) function), set an addressing parameter of the local socket as a target parameter, and generate a client descriptor according to the local socket carrying the target parameter.

As shown in FIG. 10, in step S903, the client process may bind the local socket to a second file path by using an address binding function (i.e., bind( ) function). When the client process and the service process establish a communication connection relationship, the service process may distinguish different client processes based on the second file path. It is to be understood that this binding step is not required for a client socket in network communication, because a Transmission Control Protocol (TCP) service can distinguish different client processes according to IP addresses and ports and the domain socket does not involve the concepts of IP address and port.

As shown in FIG. 10, in step S904, the local socket of the client process specifies a first file path to which the communication socket is bound, and the client process sends a process connection request to the service process by using a connection function (i.e., connect( ) function) to establish a communication connection relationship between the local socket of the client process and a service socket of the service process after the service process creates the service socket. After establishing the communication connection relationship between the client process and the service process, the client process may perform step S905. To be specific, the client process sends a service calling request to the service process by using a sending function (i.e., write( ) function) based on the communication connection relationship. After the service process performs service processing on the service calling request based on the service socket, the client process receives request result information returned by the service process by using a receiving function (i.e., read( ) function), and performs result parsing on the request result information to obtain request result data. Then, in step S906, the service call request of the application client for the local service is ended. It can be understood that after the client process and the service process establish the communication connection relationship, the client process may send the service calling request to the service process multiple times without re-establishing the communication connection relationship with the service process for each service calling request.

It is to be understood that the client process may serially perform steps S901 to S906 shown in FIG. 10. In some embodiments, the client process may perform steps S901 to S906 shown in FIG. 10 in parallel or asynchronously when high performance of the application client is required. The execution order of steps S901 to S906 is not limited in the embodiments of this application.

Figure 11:
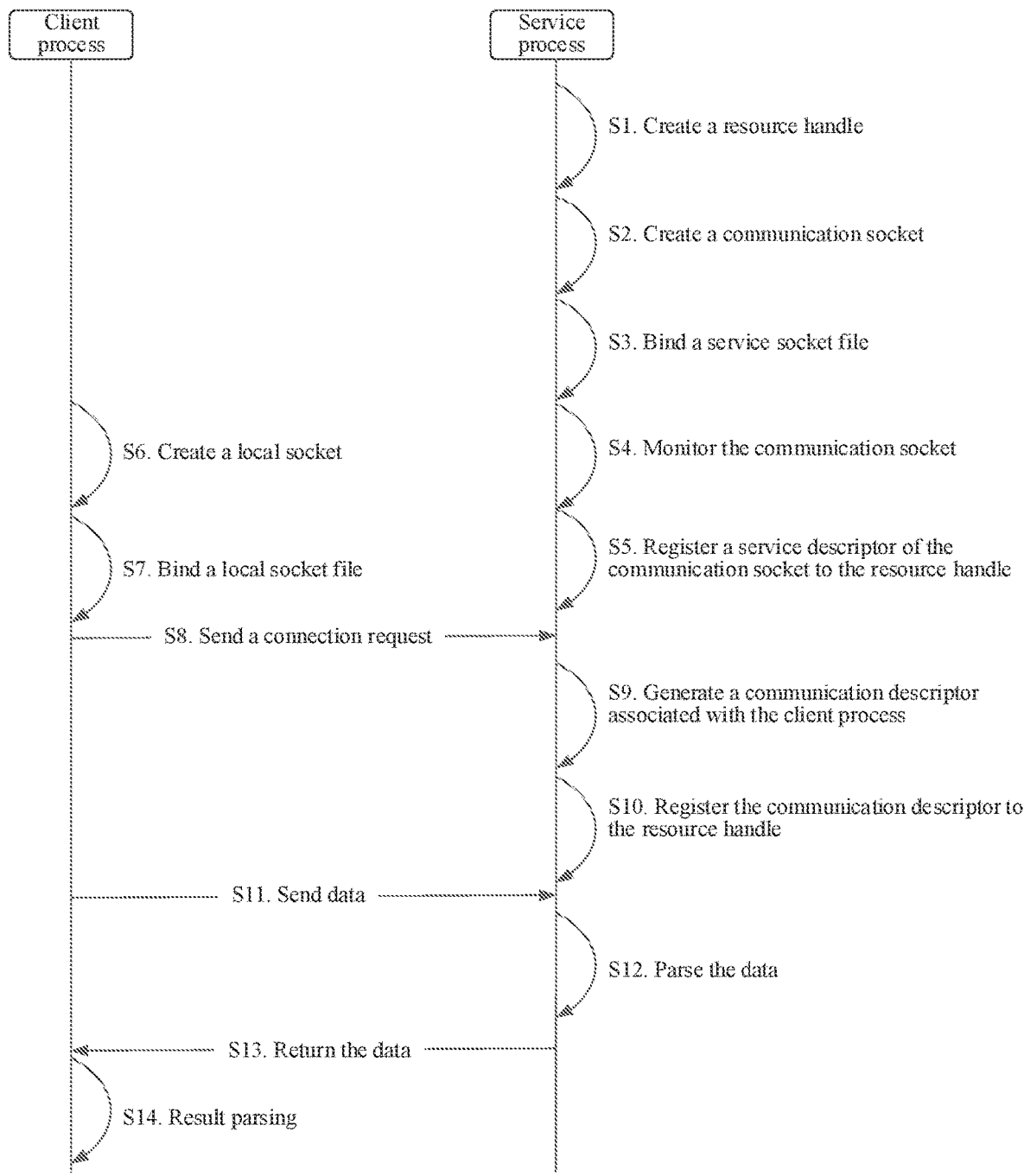
FIG. 11 is a schematic flowchart of inter-process communication according to an embodiment of this application.

It is to be understood that when the building of the local service environment is completed in the user terminal, the service process corresponding to the key management service may receive the service call request sent by the application client, and then provide a service for the application client. For ease of understanding, referring to FIG. 11, FIG. 11 is a schematic flowchart of inter-process communication according to an embodiment of this application. As shown in FIG. 11, the client process may be a process corresponding to the application client, and the service process may be a process corresponding to the key management service. The user terminal may implement IPC communication between the client process and the service process based on a domain socket and a file resource descriptor management tool, and data communication between the application client and the key management service on the user terminal may further be implemented by performing steps S1 to S14 shown in FIG. 11.

As shown in FIG. 11, the service process may perform step S1 to create a resource handle by using an epoll_create( ) function; then perform step S2 to create a communication socket by using a socket( ) function; perform step S3 to bind the communication socket to a first file path of a service socket file by using a bind( ) function; perform step S4 to monitor the communication socket by using a listen( ) function; and perform step S5 to register a service descriptor of the communication socket to the resource handle by using an epoll_ctl( ) function.

As shown in FIG. 11, the client process may perform step S6 to create a local socket by using a socket( ) function, and then perform step S7 to bind the local socket to a second file path of a local socket file by using a bind( ) function. In step S8, the client process may send a connection request (i.e., a process connection request) to the service process by using a connect( ) function. In this way, the service process may receive the connection request sent by the client process by using an accept( ) function and generate a communication descriptor associated with the client process in step S9, and then register the communication descriptor with the resource handle by using an epoll_ctl( ) function in step S10.

As shown in FIG. 11 after performing step S10, the service process may establish a communication connection relationship with the client process. In this way, the client process may perform step S11 to send data (i.e., service calling request) to the service process by using a write( ) function. The service process may perform step S12 to receive the service call request sent by the client process by using a read( ) function, parse data in a service data packet carried in the service call request, call a certain service called by the client process, and then return data (i.e., request result information) to the client process by using a write( ) function. Therefore, the client process may receive the request result information returned by the service process by using a read( ) function, and then perform step S14 to parse the request result information.

It can be understood that the service process may include multiple threads, where the multiple threads may specifically include a main thread and multiple worker threads, and the above steps may be jointly performed by multiple threads of the service process. The multiple threads may be collectively referred to as the service process, and threads executing each step are not distinguished herein.

Figure 12:
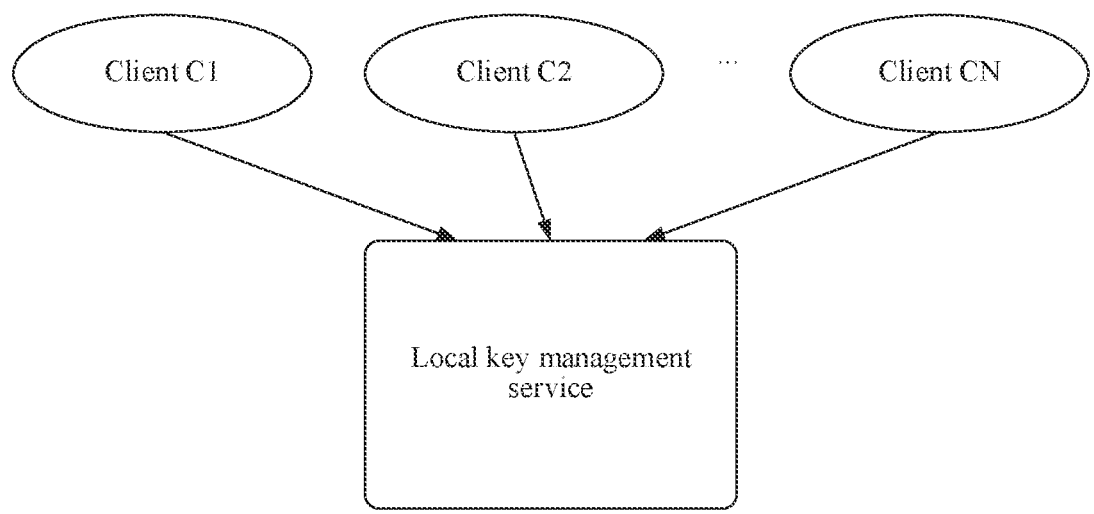
FIG. 12 is a schematic diagram of a scenario where a plurality of clients call a local key management service according to an embodiment of this application.

For ease of understanding, referring to FIG. 12, FIG. 12 is a schematic diagram of a scenario where a plurality of clients call a local key management service according to an embodiment of this application. As shown in FIG. 12, the local key management service provided in the embodiment of this application can support simultaneous call by multiple clients. For the multiple application clients, refer to the multiple application clients shown in FIG. 2.

Based on this, when the application client C1, the application client C2, . . . , and the application client CN send a call calling request to the same local service, a service process indicated by the local key management service may establish a communication connection relationship with the application client C1, the application client C2, . . . , and the application client CN respectively, create different communication descriptors for a client process J1 indicated by the application client C1, a client process J2 indicated by the application client C2, . . . , and a client process JN indicated by the application client CN. For example, the communication descriptor corresponding to the application client C1 may be F1, ..., and the communication descriptor corresponding to the application client CN may be FN. Therefore, the service process may receive the service calling request sent by the client process J1 based on the communication descriptor F1, ..., and receive the service calling request sent by the client process JN based on the communication descriptor FN.

Step S216. Serialize the service data stored in the trusted internal memory in the enclave container to obtain the serialized data corresponding to the service data in response to disabling a key management service indicated by the untrusted environment.

Step S217. Acquire the local key in the enclave container, encrypt the serialized data based on the local key to obtain a sealed data file, and release the enclave container in the trusted environment, the sealed data file being used for being copied to an untrusted internal memory indicated by the untrusted environment.

It can be understood that, the client process may disable the local socket by using a close function (i.e., close( ) function), and the service process may disable the communication socket by using the close function. It is to be understood that the service process may also disable the service socket by using this close function.

Figure 13:
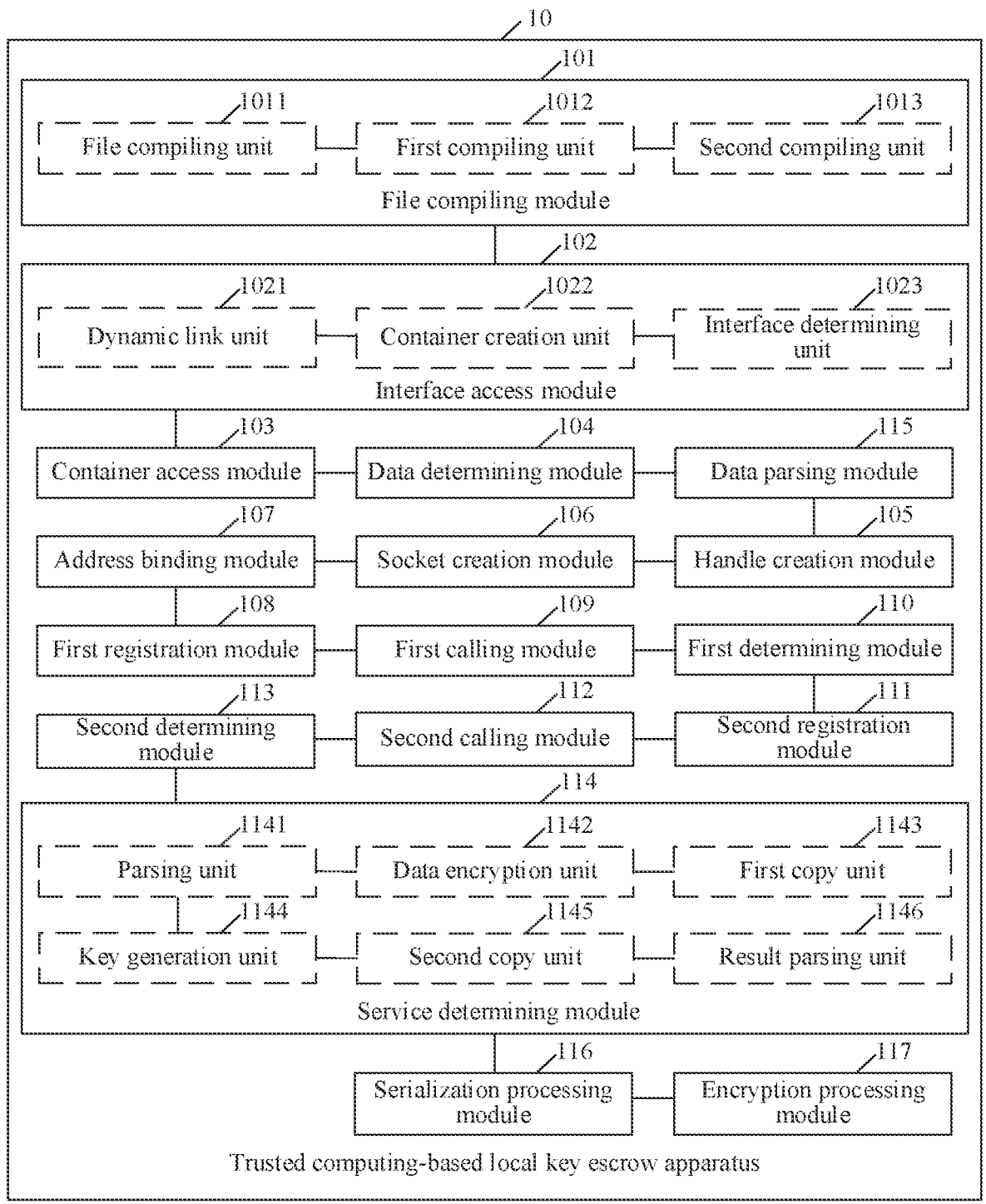
FIG. 13 is a schematic structural diagram of a trusted computing-based local key escrow apparatus according to an embodiment of this application.

Further, referring to FIG. 13, FIG. 13 is a schematic structural diagram of a trusted computing-based local key escrow apparatus according to an embodiment of this application. The trusted computing-based local key escrow apparatus 10 may include: a file compiling module 101, an interface access module 102, a container access module 103, and a data determining module 104.

The file compilation module 101 is configured to acquire an executable file and a dynamic link file based on an enclave interface definition file in a local internal memory, the enclave interface definition file being used for environment compilation, the executable file being associated with untrusted environment, and the dynamic link file being associated with a trusted environment.

The interface access module 102 is configured to load the dynamic link file based on the executable file, and determine an environment access interface associated with the trusted environment.

The container access module 103 is configured to read a sealed data file from the untrusted environment through an enclave container in the trusted environment during accessing the trusted environment through the environment access interface, the sealed data file being obtained by encrypting serialized data based on a local key in the enclave container, and the serialized data being obtained by serializing service data requested by an application client in the enclave container.

The data determining module 104 is configured to decrypt the sealed data file to obtain the serialized data based on the local key in the enclave container, and deserialize the serialized data to obtain the service data, the service data being used for being loaded into a trusted internal memory indicated by the enclave container.

In an embodiment, the file compiling module 101 includes: a file compiling unit 1011, a first compiling unit 1012, a second compiling unit 1013.

The file compiling unit 1011 is configured to acquire the enclave interface definition file in the local internal memory, and compile untrusted binding data corresponding to the untrusted environment and trusted binding data corresponding to the trusted environment based on interface definition data in the enclave interface definition file, the untrusted binding data including an untrusted header file and an untrusted source file, and the trusted binding data including a trusted header file and a trusted source file.

The first compiling unit 1012 is configured to acquire a request receiving file in the untrusted environment, and compile the executable file associated with the untrusted environment based on the request receiving file, the untrusted header file, and the untrusted source file, the request receiving file being used for receiving a user calling request.

The second compiling unit 1013 is configured to compile the dynamic link file associated with the trusted environment based on the trusted header file and the trusted source file.

For specific implementations of the file compiling unit 1011, the first compiling unit 1012, the second compiling unit 1013, reference may be made to the description of step S101 in the embodiment corresponding to FIG. 3, and the details will not be repeated here.

In some embodiments, the interface access module 102 includes a dynamic link unit 1021, a container creation unit 1022, and an interface determining unit 1023.

The dynamic link unit 1021 is configured to configure a file path of the dynamic link file in the untrusted environment, and dynamically link the dynamic link file to the executable file based on the file path of the dynamic link file.

In some embodiments, a local service indicated by the untrusted environment includes a key management service; a local service indicated by the trusted environment includes a trusted storage service; and the container creation unit 1022 is configured to create an enclave container containing a startup token in the trusted environment, the startup token being used for indicating that both the key management service and the trusted storage service have passed signature verification; and the interface determining unit 1023 is configured to determine the environment access interface associated with the enclave container based on a container identifier of the enclave container.

For specific implementations of the dynamic link unit 1021, the container creation unit 1022, and the interface determining unit 1023, reference may be made to the description of step S102 in the embodiment corresponding to FIG. 3, and the details will not be repeated here.

In some embodiments, the apparatus further includes: a handle creation module 105, configured to: in response to starting a key management service indicated by the untrusted environment, run a service process of the key management service in the untrusted environment, create a resource handle for a file resource descriptor management tool through a main thread of the service process, and perform event listening on a file descriptor registered on the resource handle by using an event waiting function indicated by the file resource descriptor management tool;

a socket creation module 106, configured to: create a communication socket on a worker thread of the service process, set an addressing parameter of the communication socket as a target parameter, and generate a service descriptor according to the communication socket carrying the target parameter, the target parameter being used for instructing to perform communication between local processes in a same device;

an address binding module 107, configured to bind a first file path for the communication socket by using an address binding function, the first file path being indicated by a service socket file for process communication; and listen to a connection event of the first file path by using a listening function of the communication socket; and a first registration module 108, configured to: in response to the service descriptor being set to a non-blocking mode by the worker thread, register the service descriptor carrying the non-blocking mode to the resource handle by using a registration function indicated by the file resource descriptor management tool on the main thread.

In some embodiments, the apparatus further includes: a first calling module 109, configured to: in response to receiving a process connection request of a client process of the application client, listen to the connection event carried in the process connection request by using the resource handle on the main thread, and call a listening callback function corresponding to the service descriptor to generate first callback information, the process connection request being transmitted by the client process based on a second file path indicated by a local socket file for process communication;

a first determining module 110, configured to acquire a request reception acknowledgement instruction from the first callback information through the worker thread, and generate a communication descriptor associated with the client process based on the request reception acknowledgement instruction; and a second registration module 111, configured to register the communication descriptor to the resource handle by using the registration function indicated by the file resource descriptor management tool on the main thread. The communication descriptor belongs to the file descriptor that the resource handle listens on.

The communication descriptor is used for indicating that the service process and the client process successfully establish a communication connection relationship; and in some embodiments, the apparatus further includes: a second calling module 112, configured to receive, based on the communication connection relationship, a service call request transmitted by the client process, listen, through the resource handle, a call event carried in the service call request for pointing to the first file path, and call a listening callback function corresponding to the communication descriptor to generate second callback information, the service call request being transmitted by the client process based on the communication connection relationship;

a second determining module 113, configured to acquire a data receiving instruction from the second callback information through the worker thread, receive a service data packet carried in the service call request based on the data receiving instruction, and temporarily store the service data packet to a cache indicated by the untrusted environment; and a service determining module 114, configured to parse the service data packet in the cache to obtain service data requested by the client process, and determine an associated service associated with the trusted environment based on a service type indicated by the service data.

In an embodiment, the service determining module 114 includes: a parsing processing unit 1141 and a data encryption unit 1142. In some embodiments, the service determining module 114 may further include: a first copy unit 1143, a key generation unit 1144, a second copy unit 1145, and a result parsing unit 1146.

The parsing processing unit 1141 is configured to parse the service data packet in the cache based on the communication connection relationship to obtain the service data requested by the client process.

The data encryption unit 1142 is configured to: in response to the service type being a data encryption type, acquire service logic interfaces provided by the enclave container based on the container identifier, determine a first service logic interface corresponding to the data encryption type in the service logic interfaces, and determine a data encryption service corresponding to the first service logic interface as the associated service associated with the trusted environment, the data encryption service is used for instructing to encrypt to-be-encrypted data indicated by the service data based on a user key of the application client in the enclave container, and the user key being generated based on a data encryption program in the enclave container.

In some embodiments, the first copy unit 1143 is configured to: in response to the associated service indicating that the to-be-encrypted data is successfully encrypted in the enclave container, generate encryption success indication information based on encrypted service data obtained by the encryption, and copy the encryption success indication information to the untrusted environment.

In some embodiments, the key generation unit 1144 is configured to: in response to the service type being a key generation type, acquire the service logic interfaces provided by the enclave container based on the container identifier, determine a second service logic interface corresponding to the key generation type in the service logic interfaces, and determine a key generation service corresponding to the second service logic interface as the associated service associated with the trusted environment, the key generation service is used for instructing to generate the user key for encryption processing based on the data encryption program in the enclave container; and the second copy unit 1145 is configured to: in response to the associated service indicating that the user key is successfully generated in the enclave container, generating key success indication information corresponding to the user key, and copying the key success indication information to the untrusted environment.

In some embodiments, the result parsing unit 1146 is configured to: during the copying the key success indication information to the untrusted environment, return the key success indication information to the client process based on the communication connection relationship, so that the client process performs result parsing on the key success indication information.

For specific implementations of the parsing processing unit 1141, the data encryption unit 1142, the first copy unit 1143, the key generation unit 1144, the second copy unit 1145, and the result parsing unit 1146, reference may be made to the description of step S215 in the embodiment corresponding to FIG. 8, and the details will not be repeated here.

In some embodiments, the data parsing module 115 is configured to: in response to loading the service data into the trusted internal memory indicated by the enclave container, parse the service data into a key-value pair including a client identifier and a user key based on a data parsing format corresponding to the trusted internal memory, the user key being generated by a data encryption program in the enclave container in response to a request of the application client for calling a service logic interface provided by the enclave container, and the client identifier being used for identifying an identity of the application client in the untrusted environment.

In some embodiments, the apparatus further includes: a serialization processing module 116, configured to serialize the service data stored in the trusted internal memory in the enclave container to obtain the serialized data corresponding to the service data in response to disabling a key management service indicated by the untrusted environment; and an encryption processing module 117, configured to acquire the local key in the enclave container, encrypt the serialized data based on the local key to obtain a sealed data file, and release the enclave container in the trusted environment, the sealed data file being used for being copied to an untrusted internal memory indicated by the untrusted environment.

For specific implementations of the file compiling module 101, the interface access module 102, the container access module 103, and the data determining module 104, reference may be made to the description of step S101 to step S104 in the embodiment corresponding to FIG. 3, and the details will not be repeated here. In some embodiments, for specific implementations of the handle creation module 105, the socket creation module 106, the address binding module 107, the first registration module 108, the first calling module 109, the first determining module 110, the second registration module 111, the second calling module 112, the second determining module 113, the service determining module 114, the data parsing module 115, the serialization processing module 116, and the encryption processing module 117, reference may be made to the description of step S205 to step S217 in the embodiment corresponding to FIG. 8, and the details will not be repeated here. In addition, the description of beneficial effects of the same method are not described herein again.

Figure 14:
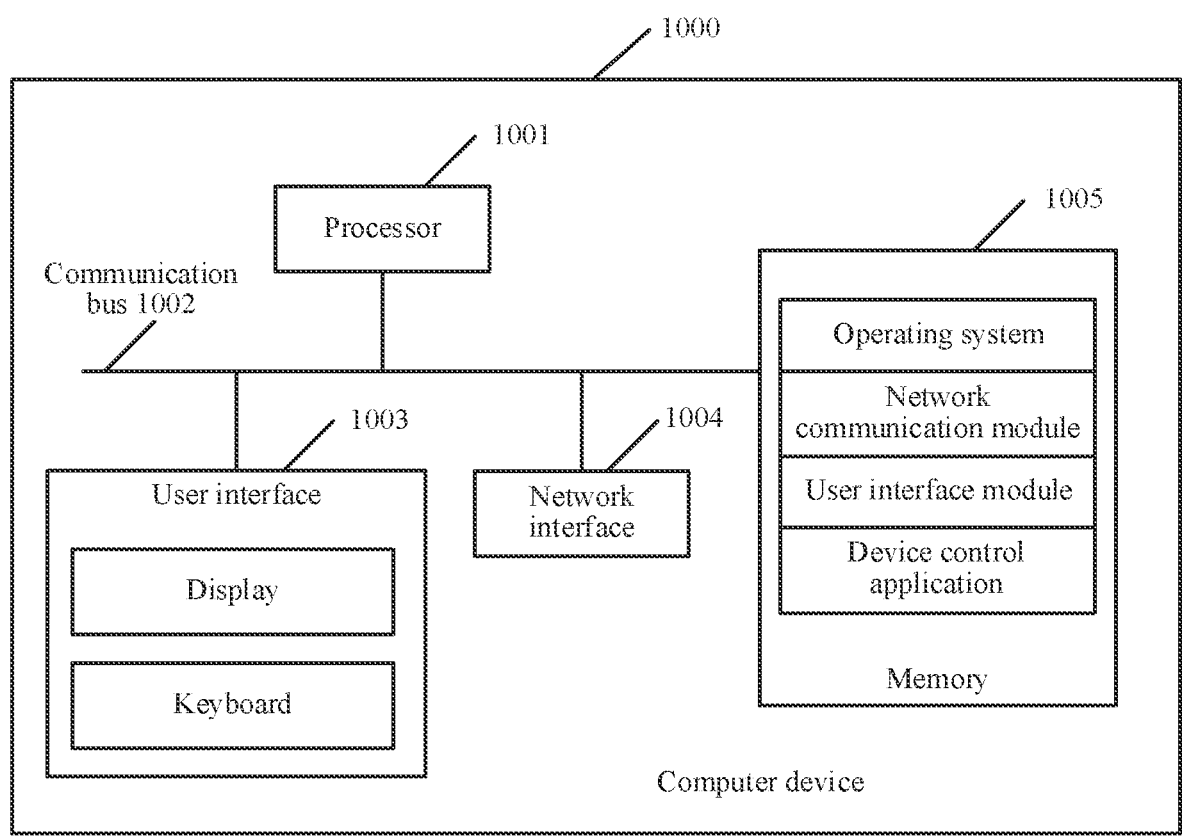
FIG. 14 is a schematic structural diagram of a computer device according to an embodiment of this application.

Further, referring to FIG. 14, FIG. 14 is a schematic structural diagram of a computer device according to an embodiment of this application. As shown in FIG. 14, the computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between these components. The user interface 1003 may include a display and a keyboard. Optionally, the user interface 1003 may further include a standard wired interface and a standard wireless interface. In some embodiments, the network interface 1004 may include a standard wired interface and a standard wireless interface (such as a WiFi interface). The memory 1005 may be a high-speed RAM, or may be a non-volatile memory, for example, at least one magnetic disk memory. In some embodiments, the memory 1005 may alternatively be at least one storage apparatus far away from the processor 1001. As shown in FIG. 14, the memory 1005 used as a computer-readable storage medium may include an operating system, a network communication module, a user interface module, and a device control application.

In the computer device 1000 shown in FIG. 14, the network interface 1004 may provide a network communication function, the user interface 1003 is mainly configured to provide an input interface for a user, and the processor 1001 may be configured to invoke the device control application stored in the memory 1005, to implement: acquiring an executable file and a dynamic link file based on an enclave interface definition file in a local internal memory, the enclave interface definition file being used for environment compilation, the executable file being associated with untrusted environment, and the dynamic link file being associated with a trusted environment; loading the dynamic link file based on the executable file, and determining an environment access interface associated with the trusted environment; reading a sealed data file from the untrusted environment through an enclave container in the trusted environment during accessing the trusted environment through the environment access interface, the sealed data file being obtained by encrypting serialized data based on a local key in the enclave container, and the serialized data being obtained by serializing service data requested by an application client in the enclave container; and decrypting the sealed data file to obtain the serialized data based on the local key in the enclave container, and deserializing the serialized data to obtain the service data, the service data being used for being loaded into a trusted internal memory indicated by the enclave container.

It is to be understood that the computer device 1000 described in the embodiments of this application may execute the description of the trusted computing-based local key escrow method in the foregoing embodiments corresponding to FIG. 3 to FIG. 8, and may also execute the description of the trusted computing-based local key escrow apparatus 10 in the foregoing embodiment corresponding to FIG. 13, and the details will not be repeated here. In addition, the description of beneficial effects of the same method are not described herein again.

In addition, it is to be noted that: an embodiment of this application further provides a computer-readable storage medium. The computer-readable storage medium stores a computer program executed by the trusted computing-based local key escrow apparatus 10 mentioned above, and the computer program includes program instructions. When executing the program instructions, the processor can implement the descriptions of the trusted computing-based local key escrow method in the foregoing embodiment corresponding to FIG. 3 or FIG. 8. Therefore, details are not described herein again. In addition, the description of beneficial effects of the same method are not described herein again. For technical details that are not disclosed in the embodiment of the computer-readable storage medium of this application, refer to the descriptions of the method embodiments of this application.

In addition, it is to be noted that: The embodiments of this application further provide a computer program product or a computer program. The computer program product or the computer program may include computer instructions, the computer instructions may be stored in a computer-readable storage medium. A processor of a computer device reads the computer instructions from the computer-readable storage medium, and may execute the computer instructions, so that the computer device implements the descriptions of the trusted computing-based local key escrow method in the foregoing embodiment corresponding to FIG. 3 or FIG. 8. In addition, the description of beneficial effects of the same method are not described herein again. For technical details that are not disclosed in the embodiment of the computer program product or the computer program of this application, refer to the descriptions of the method embodiments of this application.

A person of ordinary skill in the art may understand that all or some of the processes of the methods in the embodiments may be implemented by a computer program instructing relevant hardware. The computer program may be stored in a computer-readable storage medium. When the program is executed, the procedures of the foregoing method embodiments are performed. The storage medium may include a magnetic disc, an optical disc, a read-only memory (ROM), a random access memory (RAM), or the like.

The foregoing disclosure is merely exemplary embodiments of this application, and certainly is not intended to limit the protection scope of this application. Therefore, equivalent variations made in accordance with the claims of this application fall within the scope of this application.

What is claimed is:

1. A trusted computing-based local key escrow method, executed by a computer device, and comprising:
   acquiring an executable file and a dynamic link file based on an enclave interface definition file in a local internal memory, the enclave interface definition file being used for environment compilation, the executable file being associated with untrusted environment, and the dynamic link file being associated with a trusted environment;
   loading the dynamic link file based on the executable file, and determining an environment access interface associated with the trusted environment;
   accessing the trusted environment through the environment access interface;
   while accessing the trusted environment through the environment access interface, reading, by a component of the trusted environment through an enclave container, a sealed data file from the untrusted environment, the sealed data file being obtained by encrypting serialized data in the enclave container based on a local key, and the serialized data being obtained in the enclave container by serializing service data requested by an application client; and
   decrypting the sealed data file to obtain the serialized data based on the local key in the enclave container; and
   deserializing the serialized data to obtain the service data, wherein the service data is configured for storage in a trusted internal memory indicated by the enclave container, the trusted internal memory being a trusted portion of the local internal memory.

2. The method according to claim 1, wherein acquiring the executable file and the dynamic link file based on the enclave interface definition file in the local internal memory comprises:
   acquiring the enclave interface definition file in the local internal memory;
   compiling untrusted binding data corresponding to the untrusted environment and trusted binding data corresponding to the trusted environment based on interface definition data in the enclave interface definition file, the untrusted binding data comprising an untrusted header file and an untrusted source file, and the trusted binding data comprising a trusted header file and a trusted source file;
   acquiring a request receiving file in the untrusted environment, the request receiving file configured for receiving a user calling request;
   compiling the executable file associated with the untrusted environment based on the request receiving file, the untrusted header file, and the untrusted source file; and
   compiling the dynamic link file associated with the trusted environment based on the trusted header file and the trusted source file.

3. The method according to claim 1, wherein the loading the dynamic link file based on the executable file comprises:
   configuring, in the untrusted environment, a file path of the dynamic link file associated with the trusted environment; and
   dynamically linking the dynamic link file to the executable file based on the file path of the dynamic link file.

4. The method according to claim 1, wherein a local service indicated by the untrusted environment comprises a key management service;
   wherein the local service indicated by the trusted environment comprises a trusted storage service; and
   determining the environment access interface associated with the trusted environment comprises:
   creating the enclave container containing a startup token in the trusted environment, the startup token configured for indicating that both the key management service and the trusted storage service have passed signature verification; and
   determining the environment access interface associated with the enclave container based on a container identifier of the enclave container.

5. The method according to claim 4, wherein the method further comprises:
   in response to starting the key management service indicated by the untrusted environment, running a service process of the key management service in the untrusted environment, creating a resource handle for a file resource descriptor management tool through a main thread of the service process, and performing event listening on a file descriptor registered on the resource handle by using an event waiting function indicated by the file resource descriptor management tool;
   creating a communication socket on a worker thread of the service process;
   setting an addressing parameter of the communication socket as a target parameter;
   generating a service descriptor according to the communication socket carrying the target parameter, the target parameter configured for instructing to perform communication between local processes in a same device;
   binding a first file path for the communication socket by using an address binding function, the first file path being indicated by a service socket file for process communication;
   listening to a connection event of the first file path by using a listening function of the communication socket; and
   in response to the service descriptor being set to a non-blocking mode by the worker thread, registering the service descriptor carrying the non-blocking mode to the resource handle by using a registration function indicated by the file resource descriptor management tool on the main thread.

6. The method according to claim 5, wherein the method further comprises:
   in response to receiving a process connection request of a client process of the application client, listening to the connection event carried in the process connection request by using the resource handle on the main thread, and calling a listening callback function corresponding to the service descriptor to generate first callback information, the process connection request being transmitted by the client process based on a second file path indicated by a local socket file for process communication;
   acquiring a request reception acknowledgement instruction from the first callback information through the worker thread;

generating a communication descriptor associated with the client process based on the request reception acknowledgement instruction; and
registering the communication descriptor to the resource handle by using the registration function indicated by the file resource descriptor management tool on the main thread.

7. The method according to claim 6, wherein the communication descriptor is used for indicating that the service process and the client process successfully establish a communication connection relationship; and
the method further comprises:
receiving, based on the communication connection relationship, a service call request transmitted by the client process;
listening, through the resource handle, a call event carried in the service call request for pointing to the first file path;
calling a listening callback function corresponding to the communication descriptor to generate second callback information, the service call request being transmitted by the client process based on the communication connection relationship;
acquiring a data receiving instruction from the second callback information through the worker thread;
receiving a service data packet carried in the service call request based on the data receiving instruction;
temporarily storing the service data packet to a cache indicated by the untrusted environment;
parsing the service data packet in the cache to obtain service data requested by the client process; and
determining an associated service associated with the trusted environment based on a service type indicated by the service data.

8. The method according to claim 7, wherein the determining an associated service associated with the trusted environment based on a service type indicated by the service data comprises:
in response to the service type being a data encryption type, acquiring service logic interfaces provided by the enclave container based on the container identifier, determining a first service logic interface corresponding to the data encryption type in the service logic interfaces, and determining a data encryption service corresponding to the first service logic interface as the associated service associated with the trusted environment, the data encryption service is used for instructing to encrypt to-be-encrypted data indicated by the service data based on a user key of the application client in the enclave container, and the user key being generated based on a data encryption program in the enclave container.

9. The method according to claim 8, wherein the method further comprises:
in response to the associated service indicating that the to-be-encrypted data is successfully encrypted in the enclave container, generating encryption success indication information based on encrypted service data obtained by the encryption, and copying the encryption success indication information to the untrusted environment.

10. The method according to claim 8, wherein the method further comprises:
in response to the service type being a key generation type, acquiring the service logic interfaces provided by the enclave container based on the container identifier, determining a second service logic interface corresponding to the key generation type in the service logic interfaces, and determining a key generation service corresponding to the second service logic interface as the associated service associated with the trusted environment, the key generation service is used for instructing to generate the user key for encryption processing based on the data encryption program in the enclave container; and
in response to the associated service indicating that the user key is successfully generated in the enclave container, generating key success indication information corresponding to the user key, and copying the key success indication information to the untrusted environment.

11. The method according to claim 10, wherein the method further comprises:
during the copying the key success indication information to the untrusted environment, returning the key success indication information to the client process based on the communication connection relationship, so that the client process performs result parsing on the key success indication information.

12. The method according to claim 1, wherein the method further comprises:
in response to loading the service data into the trusted internal memory indicated by the enclave container, parsing the service data into a key-value pair comprising a client identifier and a user key based on a data parsing format corresponding to the trusted internal memory, the user key being generated by a data encryption program in the enclave container in response to a request of the application client for calling a service logic interface provided by the enclave container, and the client identifier is configured for identifying an identity of the application client in the untrusted environment.

13. The method according to claim 1, wherein the method further comprises:
serializing the service data stored in the trusted internal memory in the enclave container to obtain the serialized data in response to disabling a key management service indicated by the untrusted environment;
acquiring the local key in the enclave container;
encrypting the serialized data based on the local key to obtain a sealed data file; and
releasing the enclave container in the trusted environment, wherein the sealed data file is configured for being copied to an untrusted internal memory indicated by the untrusted environment.

14. A trusted computing-based local key escrow apparatus, comprising:
a processor; and
a memory in communication with the processor, the memory containing a plurality of instructions which, when executed by the processor, cause the processor to:
acquire an executable file and a dynamic link file based on an enclave interface definition file in a local internal memory, the enclave interface definition file configured for environment compilation, the executable file being associated with untrusted environment, and the dynamic link file being associated with a trusted environment;
load the dynamic link file based on the executable file;
determine an environment access interface associated with the trusted environment;
access the trusted environment through the environment access interface;

while accessing the trusted environment through the environment access interface, read, by a component of the trusted environment through an enclave container, a sealed data file from the untrusted environment, the sealed data file being obtained by encrypting serialized data in the enclave container based on a local key, and the serialized data being obtained in the enclave container by serializing service data requested by an application client; and decrypt the sealed data file to obtain the serialized data based on the local key in the enclave container; and deserialize the serialized data to obtain the service data, wherein the service data is configured for storage in a trusted internal memory indicated by the enclave container, the trusted internal memory being a trusted portion of the local internal memory.

15. The trusted computing-based local key escrow apparatus of claim 14, wherein the processor is further caused to:

in response to starting a key management service indicated by the untrusted environment, run a service process of the key management service in the untrusted environment, create a resource handle for a file resource descriptor management tool through a main thread of the service process, and perform event listening on a file descriptor registered on the resource handle by using an event waiting function indicated by the file resource descriptor management tool;

create a communication socket on a worker thread of the service process;

set an addressing parameter of the communication socket as a target parameter;

generate a service descriptor according to the communication socket carrying the target parameter, the target parameter being used to instruct to perform communication between local processes in a same device;

bind a first file path for the communication socket by using an address binding function, the first file path being indicated by a service socket file for process communication;

listen to a connection event of the first file path by using a listening function of the communication socket; and in response to the service descriptor being set to a non-blocking mode by the worker thread, register the service descriptor carrying the non-blocking mode to the resource handle by using a registration function indicated by the file resource descriptor management tool on the main thread.

16. The trusted computing-based local key escrow apparatus of claim 15, wherein the processor is further caused to:

in response to receiving a process connection request of a client process of the application client, listen to the connection event carried in the process connection request by using the resource handle on the main thread, and call a listening callback function corresponding to the service descriptor to generate first callback information, the process connection request being transmitted by the client process based on a second file path indicated by a local socket file for process communication;

acquire a request reception acknowledgement instruction from the first callback information through the worker thread;

generate a communication descriptor associated with the client process based on the request reception acknowledgement instruction; and register the communication descriptor to the resource handle by using the registration function indicated by the file resource descriptor management tool on the main thread.

17. The trusted computing-based local key escrow apparatus of claim 14, wherein the processor is further caused to:

serialize the service data stored in the trusted internal memory in the enclave container to obtain the serialized data in response to disabling a key management service indicated by the untrusted environment;

acquire the local key in the enclave container;

encrypt the serialized data based on the local key to obtain a sealed data file; and release the enclave container in the trusted environment, the sealed data file configured for being copied to an untrusted internal memory indicated by the untrusted environment.

18. A non-transitory computer-readable storage medium, storing a plurality of processor-executable instructions, the plurality of processor-executable instructions configured to, when executed by a processor, cause the processor to:

acquire an executable file and a dynamic link file based on an enclave interface definition file in a local internal memory, the enclave interface definition file configured for environment compilation, the executable file being associated with untrusted environment, and the dynamic link file being associated with a trusted environment;

load the dynamic link file based on the executable file;

determine an environment access interface associated with the trusted environment;

access the trusted environment through the environment access interface;

while accessing the trusted environment through the environment access interface, read, by a component of the trusted environment through an enclave container, a sealed data file from the untrusted environment, the sealed data file being obtained by encrypting serialized data in the enclave container based on a local key, and the serialized data being obtained in the enclave container by serializing service data requested by an application client;

decrypt the sealed data file to obtain the serialized data based on the local key in the enclave container; and deserialize the serialized data to obtain the service data, the service data wherein the service data is configured for storage in a trusted internal memory indicated by the enclave container, the trusted internal memory being a trusted portion of the local internal memory.

19. The non-transitory computer-readable storage medium of claim 18, wherein the processor-executable instructions for causing the processor to acquire the executable file and the dynamic link file based on the enclave interface definition file in the local internal memory further comprise instructions for causing the processor to:

acquire the enclave interface definition file in the local internal memory;

compile untrusted binding data corresponding to the untrusted environment and trusted binding data corresponding to the trusted environment based on interface definition data in the enclave interface definition file, the untrusted binding data comprising an untrusted header file and an untrusted source file, and the trusted binding data comprising a trusted header file and a trusted source file;

acquire a request receiving file in the untrusted environment, the request receiving file configured for receiving a user calling request;

compile the executable file associated with the untrusted environment based on the request receiving file, the untrusted header file, and the untrusted source file; and compile the dynamic link file associated with the trusted environment based on the trusted header file and the trusted source file.

20. The non-transitory computer-readable storage medium of claim 18, wherein the processor-executable instructions for causing the processor to load the dynamic link file based on the executable file further comprise processor-executable instructions for causing the processor to:

configure, in the untrusted environment, a file path of the dynamic link file associated with the trusted environment; and dynamically link the dynamic link file to the executable file based on the file path of the dynamic link file.

* * * * *